US012786745B2

(12) United States Patent
Morsey et al.

(10) Patent No.: US 12,786,745 B2
(45) Date of Patent: Nov. 3, 2026

(54) LOCK-BASED CONFLICT MITIGATION OF A RADIO ACCESS NETWORK INTELLIGENT CONTROLLER

(71) Applicant: Dell Products, L.P., Round Rock, TX (US)

(72) Inventors: Amr Morsey, Egypt (EG); Nada Elsammak, Egypt (EG); Yassin Chaddad, New Cairo (EG); Omar Gad, Cambridge (GB)

(73) Assignee: DELL PRODUCTS L.P., Round Rock, TX (US)

( * ) Notice: Subject to any disclaimer, the term of this patent is extended or adjusted under 35 U.S.C. 154(b) by 359 days.

(21) Appl. No.: 18/483,049

(22) Filed: Oct. 9, 2023

(65) Prior Publication Data

US 2025/0119761 A1 Apr. 10, 2025

(51) Int. Cl.
*H04W 48/04* (2009.01)
*H04W 24/02* (2009.01)

(52) U.S. Cl.
CPC ........... *H04W 24/02* (2013.01); *H04W 48/04* (2013.01)

(58) Field of Classification Search
None
See application file for complete search history.

(56) References Cited

U.S. PATENT DOCUMENTS 9,930,573 B2 3/2018 Cui et al.
10,778,519 B2 9/2020 Vuggrala et al.
11,711,719 B2 7/2023 White et al.
2009/0055340 A1 2/2009 Lakshminarayanan et al.
2015/0052251 A1 2/2015 Ryan et al.
(Continued)

FOREIGN PATENT DOCUMENTS

WO 2011/077011 A1 6/2011
WO 2022186912 A1 9/2022
(Continued)

OTHER PUBLICATIONS

Non-Final Office Action received for U.S. Appl. No. 18/338,595 dated Aug. 7, 2025, 12 pages.
(Continued)

*Primary Examiner* — Idowu O Osifade
(74) *Attorney, Agent, or Firm* — Amin, Turocy & Watson, LLP

(57) ABSTRACT

The described technology is generally directed towards conflict management of applications implemented on a radio access network (RAN) network. Control of an operational parameter can be assigned to a first xApp such that in the event of a second xApp is configured to adjust the parameter, the effect of applying the second xApp to the parameter is assessed based on whether the second xApp positively or negatively affects the configuration initially applied by the first xApp to the parameter. In the event of the second xApp negatively affecting the parameter, implementation of the second xApp can be denied. In the event of the second xApp positively or neutrally affects the parameter configuration applied by the first xApp, implementation of the second xApp can be approved. While implementation of the second xApp undergoes review, an access lock can be placed on the parameter to prevent another xApp from accessing the parameter.

20 Claims, 11 Drawing Sheets

(56) References Cited

U.S. PATENT DOCUMENTS

| | | | | |
|---|---|---|---|---|
| 2020/0296223 | A1 | 9/2020 | Yan et al. | |
| 2021/0344574 | A1 | 11/2021 | Tiwari et al. | |
| 2022/0283882 | A1 | 9/2022 | Singh et al. | |
| 2023/0112127 | A1 | 4/2023 | Lee et al. | |
| 2023/0336299 | A1 | 10/2023 | Manolakos et al. | |
| 2024/0022923 | A1 | 1/2024 | Arora et al. | |
| 2024/0098568 | A1* | 3/2024 | Curic | H04W 28/0925 |
| 2024/0106704 | A1 | 3/2024 | Chau et al. | |
| 2024/0129187 | A1 | 4/2024 | Panje et al. | |
| 2024/0205688 | A1 | 6/2024 | Vanjare et al. | |
| 2024/0205808 | A1 | 6/2024 | Vanjare et al. | |
| 2024/0205868 | A1 | 6/2024 | Chun | |
| 2024/0259879 | A1 | 8/2024 | Ranganath et al. | |
| 2024/0284436 | A1* | 8/2024 | Kak | H04W 24/02 |
| 2024/0305533 | A1 | 9/2024 | Bai et al. | |
| 2024/0414613 | A1 | 12/2024 | Wang et al. | |
| 2024/0422516 | A1 | 12/2024 | Dehghan et al. | |
| 2024/0422622 | A1* | 12/2024 | Grayson | H04W 28/16 |
| 2025/0193078 | A1 | 6/2025 | Yamasaki et al. | |
| 2025/0247296 | A1 | 7/2025 | Vaishnavi et al. | |

FOREIGN PATENT DOCUMENTS

| | | | |
|---|---|---|---|
| WO | 2023/091664 | A1 | 5/2023 |
| WO | 2024/145428 | A1 | 7/2024 |

OTHER PUBLICATIONS

International Search Report and Written Opinion received for PCT Application Serial No. PCT/US2023/036301 dated Jun. 20, 2024, 32 pages.

International Search report and written Opinion received for PCT Application Serial No. PCT/US2023/036195 dated Mar. 15, 2024, 22 pages.

Adamczyk, Cezary "Challenges for Conflict Mitigation in O-RAN's RAN Intelligent Controllers", IEEE, 2023, pp. 1-6.

Adamczyk et al., "Conflict Mitigation Framework and Conflict Detection in O-RAN Near-RT RIC", Arxiv:2305.07117v1, May 11, 2023, 7 pages.

O-RAN.WG3.RICARCH-R003-v04.00 O-RAN Working Group 3 (Near-Real-time RAN Intelligent Controller and E2 Interface Workgroup) Near-RT RIC Architecture, Technical Specification, 2023, 120 pages.

Notice of Allowance received for U.S. Appl. No. 18/338,595 dated Nov. 26, 2025, 09 pages.

International Preliminary Report on Patentability received for PCT Application Serial No. PCT/US2023/036195 dated Dec. 26, 2025, 15 pages.

International Preliminary Report on Patentability received for PCT Application Serial No. PCT/US2023/036301 dated Jan. 2, 2026, 23 pages.

Communication Pursuant to Rules 161(1) and 162 EPC Patent Application Serial No. 23813926.5 dated Jan. 23, 2026, 3 pages.

Communication Pursuant to Rules 161(1) and 162 EPC Patent Application Serial No. 23817569.9 dated Jan. 28, 2026, 3 pages.

"O-RAN Working Group 1 Use Cases Detailed Specification" O-RAN.WG1.Use-Cases-Detailed-Specification-R003-v10.00: Technical Specification. O-RAN Alliance 2023 (182 pages).

"O-RAN Working Group 3 (Near-Real-time RAN Intelligent Controller and E2 Interface Workgroup): Near-RT RIC Architecture" O-RAN Working Group 3 (Near-Real-time RAN Intelligent Controller and E2 Interface Workgroup) Near-RT RIC Architecture: Technical Specification. O-RAN Alliance 2023 (2 pages).

Mnih et al., "Human-level control through deep reinforcement learning" vol. 518 Nature doi:10.1038/nature 14236 Feb. 26, 2015. (13 pages).

Non-Final Office Action received for U.S. Appl. No. 18/336,299 dated Apr. 1, 2026, 14 pages.

Final Office Action received for U.S. Appl. No. 18/336,299 dated Aug. 26, 2026, 36 pages.

* cited by examiner

LOCK-BASED CONFLICT MITIGATION OF A RADIO ACCESS NETWORK INTELLIGENT CONTROLLER

BACKGROUND

Radio access networks (RANs) provide wide-area wireless connectivity to mobile devices. A RAN can be constructed from devices manufactured by disparate vendors. Given the potentially vast scale and complexity of RANs developed to meet the ever-increasing demand for cellular communications, various vendor consortiums have been formed with a view to generating specifications to facilitate configurations, techniques, methods, equipment, etc., for respective communications on a RAN. Such consortiums include the Third Generation Partnership Project (3GPP), Long-Term Evolution Fourth Generation (LTE 4G), Fifth Generation/New Radio (5G, 5G/NR), and most recently, the Open-Radio Access Network (O-RAN).

An impetus of O-RAN is for an open, disaggregated RAN, which can be achieved by splitting the RAN architecture, applications (e.g., xApps), and protocols into different, independent components. Disaggregation is anticipated to reduce energy consumption, improve system performance, and allow for rapid, open innovation in different components while ensuring a multi-vendor, vendor agnostic, operability network.

The above-described background is merely intended to provide a contextual overview of some current issues and is not intended to be exhaustive. Other contextual information may become further apparent upon review of the following detailed description.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. The sole purpose of the Summary is to present some concepts of the disclosure in a streamlined form as a prelude to the more detailed description that is presented later.

In one or more embodiments described herein, systems, devices, computer-implemented methods, configurations, apparatus, and/or computer program products are presented to identify and address operational conflict between applications implemented on a RAN.

According to one or more embodiments, a computer-implemented method is provided, wherein the method comprises receiving, from a first extended application (xApp) and by a device comprising a processor, a request to configure a control parameter, wherein the control parameter is configured to control operation of a process of network equipment that is part of a radio access network (RAN), determining, by the device, whether adjustment of the control parameter is controlled by a second xApp, and further determining, by the device, whether the second xApp has granted permission for the first xApp to adjust the control parameter. In response to the determining whether the second xApp has granted the permission indicating that the second xApp has granted the permission for the first xApp to adjust the control parameter, the method can further comprise adjusting, by the device, the control parameter in accordance with the request received from the first xApp. In an embodiment, the device can be located in one of a real-time RAN intelligent controller (RIC) or a near-real-time RIC.

In an embodiment, the method can further comprise in response to the determining whether the second xApp has granted the permission indicating that the second xApp has denied the permission for the first xApp to adjust the control parameter: denying, by the device, the request from the first xApp, and maintaining, by the device, the control parameter with a current configuration applicable to the control parameter. Further, wherein the indicating that the second xApp has denied the permission comprises the indicating that the second xApp has denied the permission for the first xApp to adjust the control parameter for a specified period of time.

In a further embodiment, the method can further comprise assigning, by the device, the control parameter to the second xApp, wherein the assigning comprises instructing the second xApp that any adjustment of the control parameter by the first xApp is to be authorized by the second xApp prior to the adjustment of the control parameter by the first xApp.

In a further embodiment, the method can further comprise determining, by the device, whether the first xApp has a first capability to access the control parameter, and in response to the determining whether the first xApp has the first capability to access the control parameter indicating that the first xApp has the first capability to access the control parameter, excluding, by the device, an access to the control parameter by a third xApp having a second capability to access the control parameter. In an embodiment, the excluding of the access to the control parameter by a third xApp can be for a specified period of time, with the method further comprising upon expiry of the specified period of time, enabling, by the device, the access to the control parameter by the third xApp.

In another embodiment, the method can further comprise (i) determining, by the device, that the second xApp is subsequently configuring the control parameter according to an updated configuration that is different than a current configuration applied to the control parameter; and (2) further determining, by the device, whether a modification of the control parameter by the first xApp conflicts with the updated configuration applied by the second xApp. Wherein, in response to the determining whether the modification of the control parameter by the first xApp conflicts with the updated configuration indicating that the modification of the control parameter by the first xApp conflicts with the updated configuration, the method further comprising terminating, by the device, the modification of the control parameter by the first xApp, and applying the updated configuration of the second xApp to the control parameter.

In another embodiment, the method can further comprise monitoring, by the device, operational history of the RAN, determining, by the device, assignment of the control parameter to the second xApp is detrimental to operation of the RAN; and further removing, assignment of the control parameter to the second xApp.

Further embodiments can utilize a system, comprising at least one processor, and a memory coupled to the at least one processor and having instructions stored thereon, wherein, when executed by the at least one processor, the instructions facilitate performance of operations, comprising receiving a configuration request from a first extended application (xApp), wherein the configuration request is to configure a control parameter utilized in a radio access network (RAN), further determining that the control parameter is assigned to a second xApp, and further identifying, in the configuration request, a first configuration to be applied by the first xApp to the control parameter. The operations can further comprise determining whether the first configuration conflicts with a second configuration applied to the control parameter by a second xApp, and in response to determining that the first configuration conflicts with the second configuration, denying the configuration request received from the first xApp. The operations can further comprise assigning the control parameter to the second xApp, wherein access to the control parameter is determined based on one or more configurations implemented by second xApp. In an embodiment, the operations can further comprise, while determining whether the first configuration conflicts with the second configuration, preventing access to the parameter by a third xApp.

In an embodiment, the operations can further comprise (i) reviewing operational history of the RAN, (ii) determining current operation of the RAN can be improved by reassigning the control parameter to a third xApp, (iii) terminating assignment of the control parameter to the second xApp, and (iv) assigning the control parameter to a third xApp. The operations can further comprise, in response to determining the first configuration does not conflict with the second configuration, applying the first configuration to the control parameter.

In another embodiment, the first xApp can be denied access to the control parameter for a defined period of time. In a further embodiment, the operations can further comprise, upon expiry of the defined period of time, determining whether the first configuration conflicts with the second configuration applied to the control parameter by the second xApp, and in response to determining no conflict exists between the first configuration and the second configuration after the expiry of the defined period of time, applying the first configuration received from the first xApp.

Further embodiments can include a computer program product stored on a non-transitory computer-readable medium and comprising machine-executable instructions, wherein when executed, the machine-executable instructions cause a machine to perform operations, comprising assigning a control parameter to a first extended application (xApp), wherein the control parameter is configured to control operation of a feature of network equipment that is part of a radio access network (RAN), receiving, from a second xApp, a configuration request, wherein the configuration request comprises a first configuration to be applied to the control parameter, further determining whether the first configuration conflicts with a second configuration, wherein the control parameter is currently configured with the second configuration, and in response to a result of the determining being that the first configuration conflicts with the second configuration, denying the configuration request received from the second xApp. In another embodiment, the operations can further comprise in response to a determination that the first configuration does not conflict with the second configuration, applying the configuration request received from the second xApp to the control parameter. In another embodiment, wherein the configuration request received from the second xApp is denied for a defined duration of time, wherein the operations can further comprise, in response to a determination that the predefined duration of time has expired, re-determining whether the first configuration conflicts with the second configuration, and in response to a result of the re-determining being that the first configuration does not conflict with the second configuration, applying the configuration request received from the second xApp to the control parameter.

In another embodiment, the operations can further comprise, while determining whether the first configuration conflicts with the second configuration, preventing access to the parameter by a third xApp.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Figure 1:
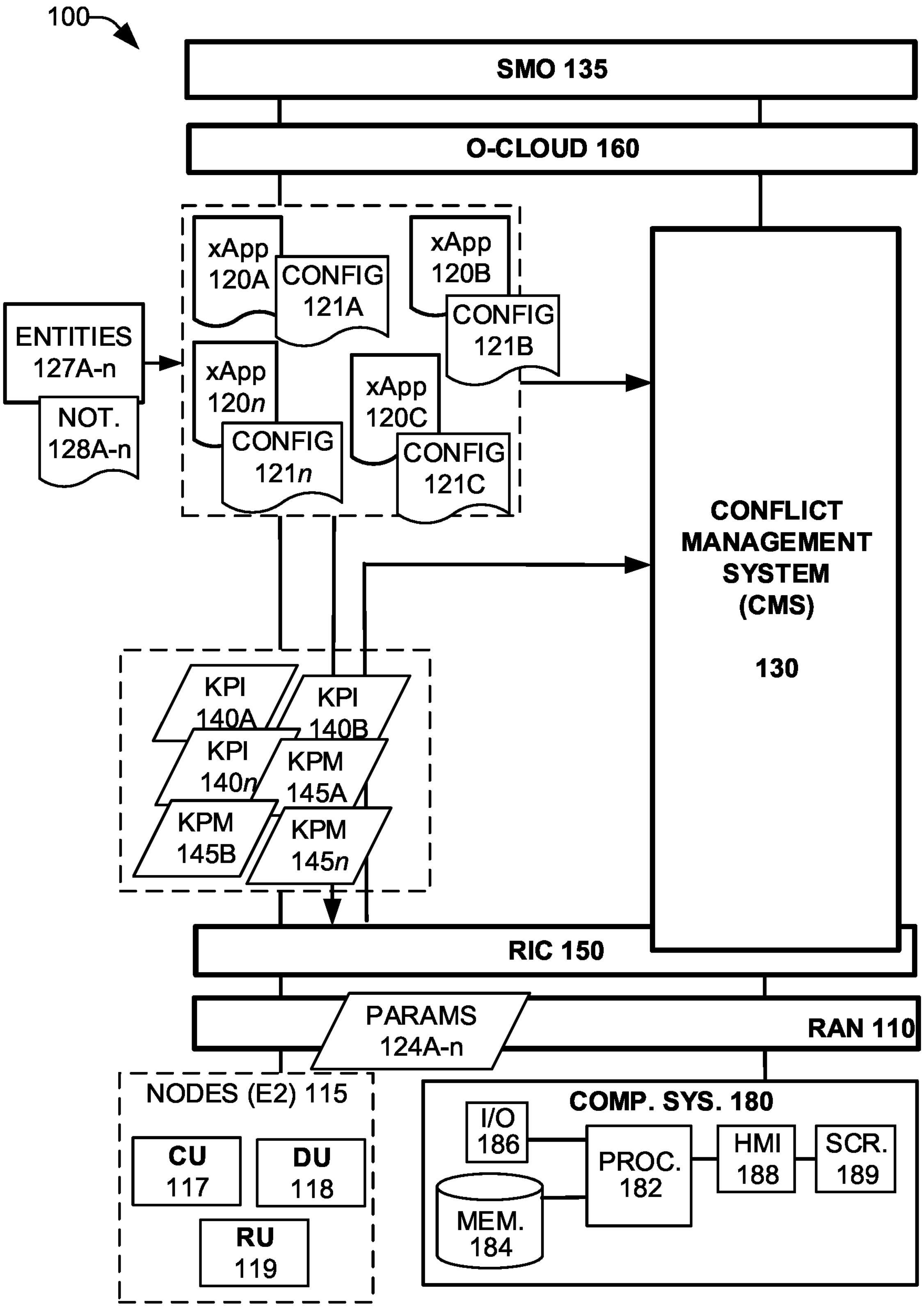
FIG. 1 presents a system comprising various components/devices and various types of interaction/analysis that can be performed regarding conflict management between various xApps deployed on a RAN, in accordance with an embodiment.

One or more embodiments are now described with reference to the drawings, wherein like reference numerals are used to refer to like elements throughout. In the following description, for purposes of explanation, numerous specific details are set forth in order to provide a thorough understanding of the various embodiments. It is to be appreciated, however, that the various embodiments can be practiced without these specific details, e.g., without applying to any particular networked environment or standard. In other instances, well-known structures and devices are shown in block diagram form in order to facilitate describing the embodiments in additional detail.

The various embodiments presented herein relate to utilizing a conflict management system (CMS) (also referred to as a conflict mitigation system) in conjunction with conflict detection and mitigation strategies. The CMS can be configured to enable implementation of the respective embodiments in any of real time (RT), near-RT, and/or non-RT. The CMS is configured to comply with O-RAN platform requirements, xApp requirements, respective RAN intelligent controller (RIC) application programming interface (API) requirements, and suchlike.

Per the respective embodiments, one or more systems are presented that are configured to support co-deployed, multi-xApp interaction. Based on detected conflicts and/or predicted conflicts, xApp subscriptions/deployments at the RAN can be approved/denied to avoid conflicting control actions. Further, implementation of machine learning (ML) and/or artificial intelligence (AI) based models can provide understanding of operation of the RAN to enable assignment of an xApp to control a configuration of a control parameter.

One or more parameters pertaining to operation of a RAN can be assigned to a primary, first xApp, wherein the first xApp controls whether a configuration can be subsequently applied to a respective parameter. During an onboarding procedure a configuration to be implemented by a secondary xApp can be parsed to (a) identify a control parameter targeted by the configuration, (b) identify whether the control parameter can be accessed/adjusted by the secondary xApp, (c) in the event of access being granted, further determine whether a primary xApp has been assigned primary control over the targeted parameter, and (d), further determine whether to grant adjustment of the control parameter by the secondary xApp as a function of the adjustment positively or negatively affects control of the parameter by the primary xApp. In an embodiment, any suitable information can be utilized to assess implementation of the configuration, such as control (level and type of control) information, targeted key performance indicator (KPI) category and sub-category, performance metrics (KPMs), xApp classification, and suchlike.

Per the respective systems/technologies presented herein, with a multi-xApp interaction framework, respective AI/ML technologies can be utilized to learn/identify an effect of implementing the configuration associated with the secondary xApp, e.g., performance change of the RAN. The AI/ML technologies can further predict KPIs in advance to establish the baseline behavior. One or more AI/ML technologies/models can be deployed to enable correlation to be established between xApp actions and the performance change, and further determine/review proposed implementation of the secondary xApp that negatively/positively affects parameter performance relative to the primary xApp.

1. Terms xApp: an extended application is a software application deployable at an O-RAN (e.g., at the RIC) and configured to optimize/automate RAN operations in conjunction with supporting use cases directed at lowering an operator's (e.g., a mobile operator) total cost of ownership (TCO), enhancing a customer's quality of experience (QoE), and suchlike. xApps are typically deployed on the RIC and communicate with other components over an end to end (E2) interface. In an example scenario of operation, xApps can be configured to implement functions and/or services in near-real time within the O-RAN architecture. The applications or services can include functionality such as radio resource management, mobility management, security, and suchlike.

Class/KPI Category: respective KPIs can be separated into classes, whereby each KPI can have its own class. Each xApp (e.g., each of xApps 120A-n) can be assigned/associated with the KPI that is the operational focus of the respective xApp. Accordingly, a potential conflict regarding a KPI can be rapidly identified based on classifying a first xApp (e.g., during onboarding) to a KPI, and determining the operational effect of the first xApp on the one or more xApps that have already been classified for that particular KPI.

Key Performance Indicator (KPI): provides a quantifiable measure of performance for a particular objective. KPIs can pertain to accessibility, availability, integrity, mobility, retainability, and suchlike.

Key Performance Measure (KPM): provides a measure of performance for a KPI.

Nodes & E2 Nodes: RAN architecture can include a range of units referred to as nodes, such as central units (CUs), distributed units (DUs), and radio units (RUs). Generally, CUs centralize RAN packet processing functions, DUs conduct baseband processing functions across cell sites, and RUs provide radio functions at antenna sites. While the RUs are located at antenna sites, the locations of CUs and DUs are not fixed to any particular geographic area or site. DUs can be co-located with RUs local to an antenna, also DUs can be located many miles from RUs, whereby connection between the DUs and RUs is by any suitable technology, e.g., fiber optics. CUs and DUs can be located "in the cloud", such as at a data center which may or may not be proximal to the RU.

O-cloud: an operational layer including hardware and software components providing cloud computing capabilities to execute various functions on the SMO, RIC, and RAN network. O-cloud functions can include O-DU, O-CU-CP, O-CU-UP, O-eNB, near-RT RIC, and non-RT RIC.

Preventative Measures: conflict management performed before a potentially adverse xApp is deployed/implemented, such that an xApp that could negatively affect operation of a RAN is prevented from being onboarded/deployed/implemented.

Radio access network (RAN): includes one or more of distributed unit(s) (DU), central unit(s) (CU), and/or radio unit(s) (RU).

RAN Intelligent Controller (RIC): The RIC is an O-RAN component configured to control and optimize RAN functions. The RIC enables O-RAN disaggregation with regard to onboarding of multi-vendor/third-party xApps to automate/optimize RAN operations, e.g., with regard to use cases that lower mobile operators' TCO, enhance customers' QoE, and suchlike. The RIC can control what xApps are deployed on a RAN. For some context, example, non-limiting Non-Real Time RIC (Non-RT RIC) functions include service and policy management, RAN analytics, and model training for the near-Real Time RICs. In this regard, the Non-RT-RIC enables non-real-time (e.g., a first range of time, such as >1 s) control of RAN elements and their resources through applications, e.g., specialized applications called xApps. Example, non-limiting Near-Real Time RIC (Near-RT RIC) functions enable near-real-time optimization and control and data monitoring of CU and DU nodes in near-RT timescales (e.g., a second range of time representing less time than the first time range, such as between 10 ms and 1 s). In this regard, the Near-RT RIC controls RAN elements and their resources with optimization actions that typically take about 10 milliseconds to about one second to complete, although different time ranges can be selected. The Near-RT RIC can receive policy guidance from the Non-RT-RIC and can provide policy feedback to the Non-RT-RIC through specialized applications, xApps. In this regard, a Real Time RIC (RT RIC) is designed to handle network functions at real time timescales (e.g., a third range of time representing less time than the first time range and the second time range, such as <10 ms).

Service management orchestration (SMO): can be configured to function as the management and orchestration layer controlling configuration and automation aspects of RIC and RAN elements. Can be further configured to handle deployment of xApps, including assigning which xApps are primary xApps for specific parameters being edited in the RAN.

n is any positive integer.

2. Overview

Figure 11:
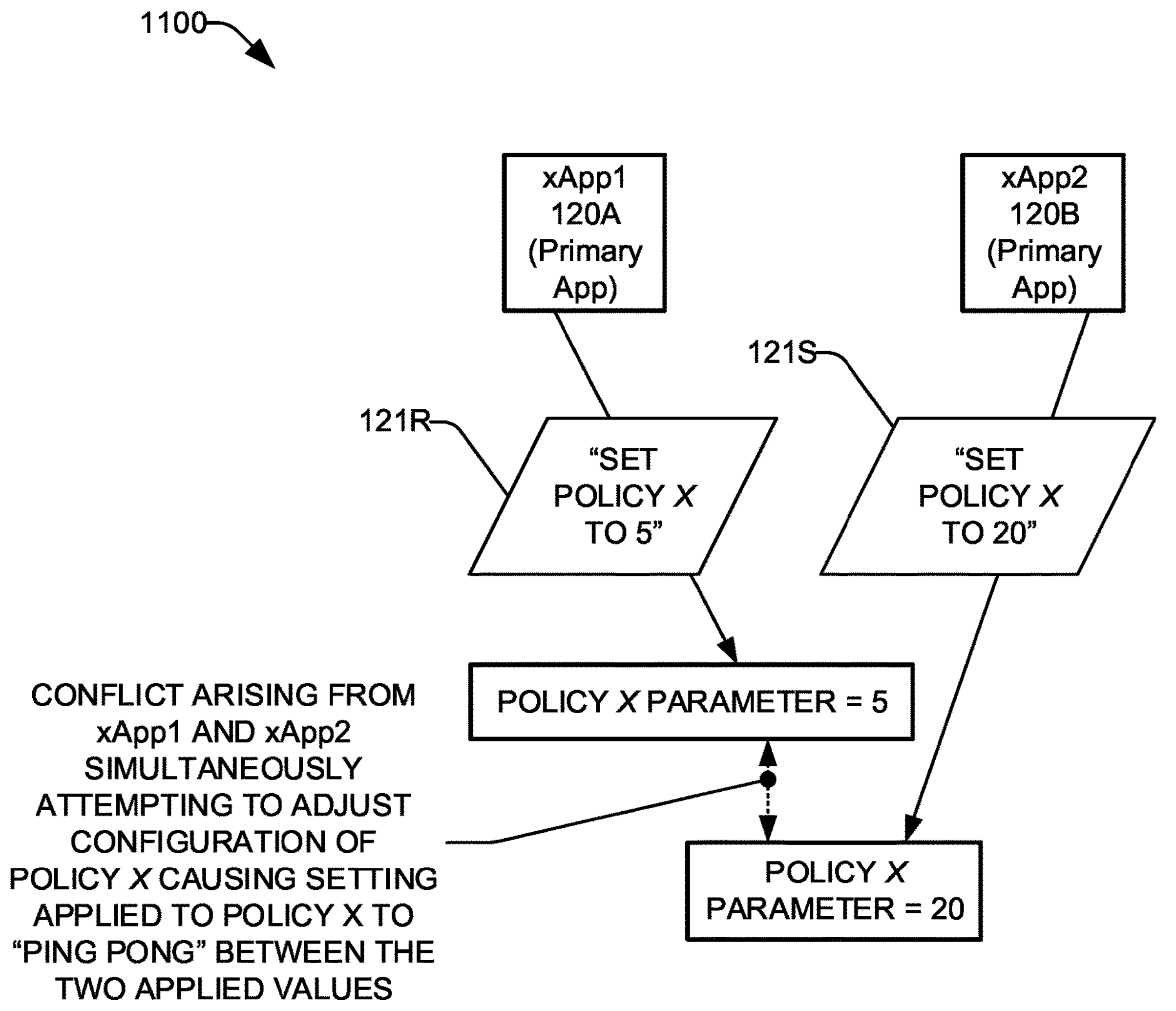
FIG. 11 presents a schematic illustrating an example of a conflict occurring with a conventional system is presented.

While an impetus of O-RAN is for an open, disaggregated RAN, the openness of the RAN architecture and protocols can give rise to (i) an xApp may not be supported by the RAN, (ii) various conflicts when multiple applications (xApps) are co-deployed on a RAN, and/or (iii) an xApp may adversely affect/cause a degradation in the performance of another xApp and/or RAN/RIC performance. System providers/operators (e.g., public land mobile network (PLMN) providers) may not be aware of the potential conflicts that may arise from deploying certain xApps on the same RAN site simultaneously. Turning briefly to FIG. 11, schematic 1100, an example of a conflict occurring with a conventional system is presented. A conflict can occur when a first xApp 120A attempts to overwrite a policy or an action recently applied/configured/set by a second xApp 120B (and vice versa). As shown, xApp 120A implements a configuration 121R for a setting of 5 to policy X, while xApp 120B implements a configuration 121S to apply a setting of 20 to policy X. This overwrite scenario may cause xApp 120A and xApp 120B to cause a value of policy X to be stuck in a state of "ping pong" between 5 and 20, wherein xApp 120A is constantly overwriting xApp 120B's decisions/configurations (and vice versa), leading to degradation/failure in performance in the RIC and/or the RAN.

The various embodiments presented herein are configured to review xApp configurations to identify/infer potential and existing conflicts between various xApps, and further manage/mitigate deleterious effects of deploying one or more conflicting xApps on a RAN and/or an RIC. When a negative relationship between xApps is identified, onboarding/implementation of a conflicting xApp can be denied, and further, a notification can be generated identifying the problematic combination of xApps to assist in subsequent avoidance of a conflict. In an embodiment, by utilizing current or historical data regarding operation of one or more xApps, a xApp and parameter combination can be identified for further assignment of a primary xApp to a parameter.

To provide understanding of the various embodiments presented herein, FIG. 1, system 100 presents a high-level overview of some of the systems/components of concern, and various types of interaction/analysis that can be performed regarding conflict management between various xApps deployed on a RAN.

As shown, FIG. 1 presents a RAN 110 for which respective xApps 120A-n can be configured to currently and/or potentially operate/function on. The RAN 110 can include various nodes 115 (e.g., E2 nodes), for example one or more of a CU 117, DU 118, and a RU 119. RAN 110 can be communicatively coupled to a service management orchestration (SMO) layer/component 135, wherein the SMO 135 can be configured to control configuration and automation aspects of respective components/elements of RAN 110 and a RIC 150. The SMO 135 can be further configured to coordinate deployment of respective xApps 120A-n, which, in an example scenario, can involve the SMO 135 operating in conjunction with the RIC 150 regarding the possibility of conflict arising during deployment of respective xApps 120A-n. System 100 can further include an O-cloud 160, an infrastructure layer configured to coordinate functions for the RAN 110, SMO 135, and the RIC 150.

The RIC 150 can be configured to control and optimize functions at RAN 110, including onboarding of xApps 120A-n to be implemented at the RAN 110. The xApps 120A-n can be generated by any entity/source, e.g., one or more entities 127A-n, wherein entities 127A-n can be an automated process, a process configured by a human operator (e.g., a PLMN engineer), and suchlike. Entities 127A-n can be located and operating within system 100 (e.g., entity 127P is an automated computer program/application) and/or external to system 100 (e.g., entity 127H is a PLMN system remotely located to RAN 110).

xApps 120A-n can be configured with respective configurations 121A-n (e.g., xApp CTRL/CMDs) wherein the respective configurations 121A-n can be applied to/targeted at one or more parameters 124A-n associated with one or more operations at the RAN 110, at the RIC 150, and suchlike. Configurations 121A-n can be any of a value setting, a requirement, an instruction, a notification, and suchlike, to adjust a current/first setting/value of a parameter 124A-n to a future/second setting/value of the parameter 124A-n. Configurations 121A-n can be directed towards any specific property, use case, metric, etc., for which the xApps 120A-n are respectively designed, with the respective property, use case, etc., of focus for each xApp 120A-n being represented as configuration 121A-n, wherein respective configuration 121A-n is associated with a respective xApp 120A-n, e.g., xApp 120A has associated configuration 121A, xApp 120B has configuration 121B, xApp 120*n* has configuration 121*n*, etc.

As further described, the RIC 150 can further include a conflict management system (CMS) 130 configured to identify potential and existing conflicts between various xApps 120A-n during potential and current deployment of one or more xApps 120A-n and respective configurations 121A-n on the RAN 110. As further described, the xApps 120A-n can affect operation of various KPIs 140A-n at the RAN 110, e.g., as determined by key performance metrics KPMs 145A-n associated with respective target parameter 124A-n. In an ideal situation, the RAN 110 would be configured to support operation of numerous xApps 120A-n. However, deployment of a first application, xApp 120B, can affect deployment of a second application (e.g., xApp 120A) on the RAN 110, and deleteriously affect one or more of the KPIs 140A-n associated with implementation of the second application, xApp 120A. Hence, conflict management and resolution are of concern when two or more xApps 120A-n are deployed, particularly where the respective xApps 120A-n are created by different vendors, which can be likely given the disaggregated nature of O-RAN systems.

As further described, during onboarding of an xApp 120A-n to the RAN 110, the CMS 130 can be configured to determine/control whether (i) an xApp 120B (e.g., a second xApp, secondary xApp) is to be granted access to potentially adjust an operational parameter/setting/feature/and suchlike, (ii) whether another xApp 120A (e.g., a first xApp, a primary xApp) has been configured to control operation/adjustment of the parameter 124A-n, and (iii) allow/deny adjustment of the parameter 124A-n by xApp 120B based whether adjustment by xApp 120B conflicts with configuration 121A of the parameter 124A by xApp 120A or not.

As shown in FIG. 1, CMS 130 and RAN 110 can be communicatively coupled to a computer system 180. The computer system 180 can comprise a processor 182 and a memory 184, wherein the processor 182 can execute the various computer-executable components, functions, operations, etc., presented herein. The memory 184 can be utilized to store the various computer-executable components, functions, code, etc., as well as information regarding any of xApps 120A-n, configurations 121A-n, parameters 124A-n, KPIs 140A-n, KPMs 145A-n, processes 275A-n, access information 262A-n, xApp & parameter pairs 263A-n, notifications 255A-n (as further described), and suchlike.

As further shown, computer system 180 can include an input/output (I/O) component 186, wherein the I/O component 186 can be any suitable interface (e.g., a transceiver, network) configured to enable transmission/receipt of information, notifications, data, etc., between any of the components included in and/or externally/remotely located (e.g., entities 127A-n) to system 100. In an embodiment, I/O component 186 can be configured to transmit various notifications/alerts/warnings (e.g., notifications 255A-n) regarding an operational conflict(s) between xApps 120A-n.

In an embodiment, the computer system 180 can further include a human-machine interface (HMI) 188 (e.g., a display, a graphical-user interface (GUI)) which can be configured to present various information including any of xApps 120A-n, configurations 121A-n, value(s) of parameters 124A-n, associated conflicts and resolutions, and suchlike, per the various embodiments presented herein. The HMI 188 can include an interactive display 189 to present the various information via various screens presented thereon, and further configured to facilitate input of information/settings/etc., regarding the xApps 120A-n.

Per the O-RAN environment presented in FIG. 1, the xApps 120A-n can respectively interact with any of the SMO platform 135, RIC 150 (e.g., controlling interface exposure), and O-cloud 160 components. It is to be appreciated that, to minimize repetition, while the various embodiments presented herein may specifically mention one or more xApps 120A-n being presented/deployed/implemented on RAN 110, RIC 150, etc., given that the ubiquitous nature of xApps 120A-n being able to be implemented on RAN 110, SMO 135, RIC 150, etc., mention of utilization of an xApp 120A-n on any of RAN 110, SMO 135, RIC 150, o-cloud 160, etc., equally applies to application on any of the respective components described herein.

The various embodiments presented herein can be utilized for RT, near-RT, and/or non-RT implementation of RICs, e.g., as present in a conventional RAN architecture. In conventional systems, implementation solutions to address conflicts between xApps 120A-n are not available in near-RT or RT, which the various embodiments presented herein address. The various embodiments presented herein provide a management architecture utilizing the CMS 130 to identify and resolve conflict issues as a function of one or more operational requirements of the RAN 110, operational requirements of respective xApps 120A-n, RIC 150 API requirements, vendor agnostic approaches, and suchlike.

3.1. Conflicts Overview

The following provides an overview of some of the conflicts that may be present between various xApps 120A-n deployed on a RAN 110. As mentioned, respective xApps 120A-n can configure a single parameter 124A or a set of parameters 124A-n to optimize a specific metric (e.g., a KPI 140A-n) at the RAN 110. Each xApps 120A-n can have a specific control target (e.g., target associated with any of parameters 124A-n). For example, the control parameter 124A targeted by two or more xApps 120A-n deployed as part of a radio resource management (RRM) application can be a cell, a user equipment (UE), a bearer, and suchlike. Further, the control content of RRM can include access control, bearer control, handover control, resource allocation, quality of service (QOS) control, and suchlike. Furthermore, the control command can have a control time span which indicates the valid control duration. Hence, at any time, a conflict can exist between the control command of the respective xApps 120A-n, e.g., as they pertain to RRM.

3.2. Direct Conflicts

A direct conflict can occur between multiple xApps 120A-n, and can be directly observed by CMS 130. The following presents examples of conflicts:

i) one or more target parameters 124A-n receive different setting requests/instructions/requirements through two or more xApps 120A-n. The CMS 130 can be configured to process the respective requests and decide which to implement based on operational impact and/or other metrics.

ii) a configuration 121A-n may be currently implemented (e.g., a previous request has been implemented and an operation is running). A new configuration request from a first xApp (e.g., xApp 120F) may conflict with the currently implemented configuration from the same xApp (e.g., xApp 120F) or a different xApp (e.g., xApp 120G). Hence, a conflict can be engendered as a function of an addition of a new request in view of a prior request.

3.3. Indirect & Implicit Conflicts:

Conflicts between multiple xApps 120A-n may not be able to be observed directly. However, some dependencies among the target parameters (e.g., target parameter 124A, per FIG. 2) and resources of different xApps 120A-n can be observed. As further described, CMS 130 can be configured to predict potential conflicts and operate to avoid and/or mitigate a conflict. An example of indirect conflict is where different xApps 120A-n target different parameters 124A-n to optimize the same metric based on the respective objective of the respective xApps 120A-n. Such a situation may not result in conflicting parameter settings but configuration of a first xApp 120P may impact the system metric (e.g., a target parameter 124A, a KPI 140A, a KPM 145A) which can be equivalent to a parameter change targeted by another xApp 120Q. For example, antenna tilts and cell Individual offset (CIO) are two distinct control actions, wherein an antenna tilt configuration (e.g., target parameter 124A) is targeted by configuration 121P of xApp 120P while CIO (e.g., target parameter 124B) is targeted by configuration 121Q of xApp 120Q, but both control actions can impact handover function(s).

Implicit conflicts are not directly visible, and further, the dependencies between multiple xApps 120A-n cannot be directly observed. Essentially, different xApps 120A-n optimize different metrics with different parameters 124A-n. In such a situation, optimization of a first metric may adversely affect other metrics optimized by other xApps 120A-n. For example, throughput metrics for guaranteed bit rate (GBR) users may degrade metrics of non-GBR users or overall cell throughput.

As further described, mitigation (e.g., by the CMS 130) of implicit conflicts may not be achievable via analytical modeling prior to deploying an xApp 120A-n because operational dependencies between two or more xApps 120A-n can be difficult to predict/observe. Accordingly, AI and ML based coordination schemes (e.g., per implementation of processes 275A-n by process component 270, as further described) can be utilized at the CMS 130 to identify inter-application dependencies between the two or more xApps 120A-n. In an embodiment, a conflict detection scheme can be provided (e.g., by CMS 130) based on, for example, end-to-end (E2E) system performance and network intent, a specific use case, and suchlike.

4. Conflict Management System

Figure 2:
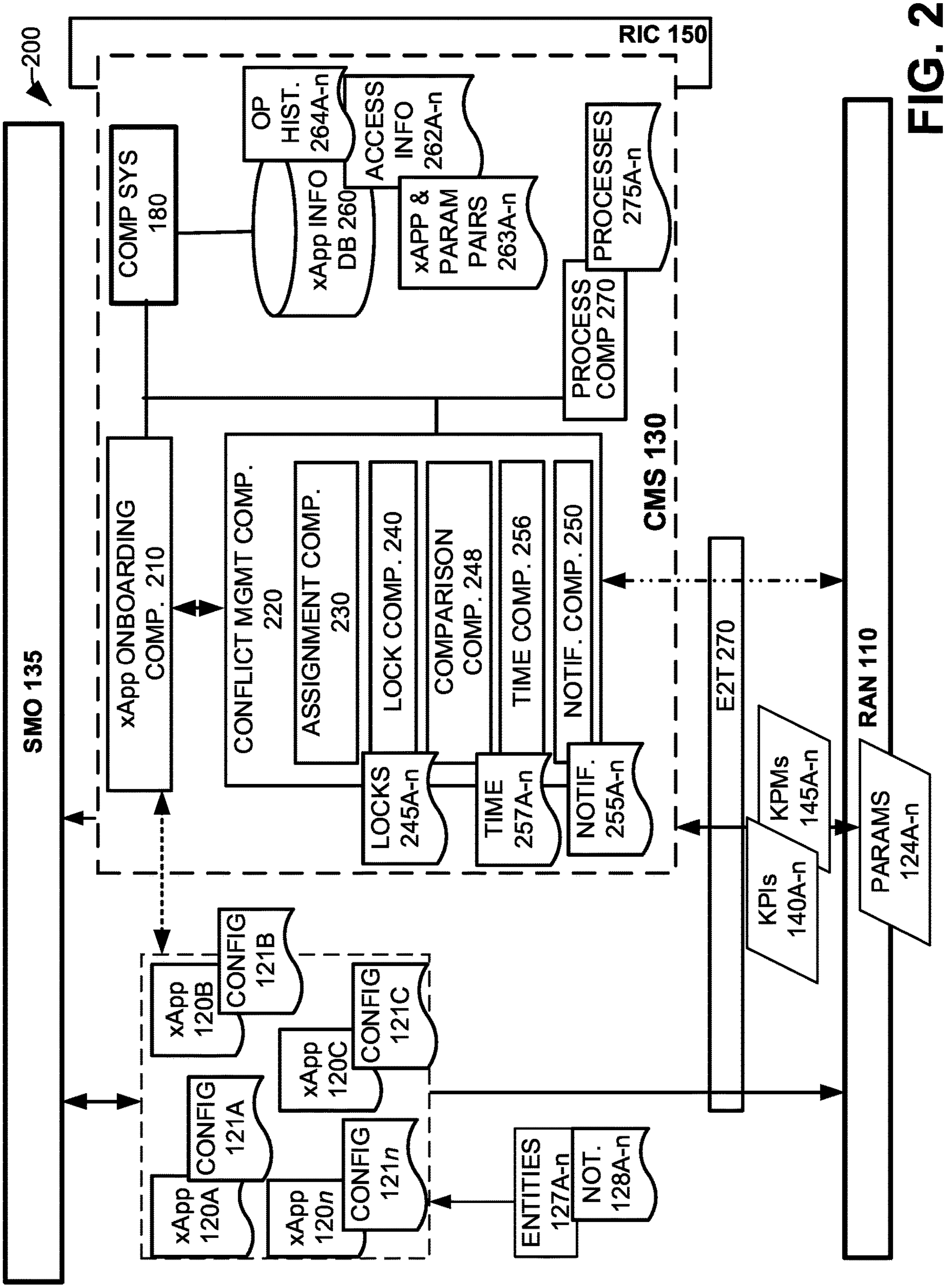
FIG. 2 illustrates a system comprising xApp conflict management architecture, in accordance with an embodiment.

FIG. 2, system 200, illustrates an xApp conflict management architecture, in accordance with an embodiment. As shown, a collection of xApps 120A-n is to be deployed and/or are currently deployed on RAN 110. As previously mentioned, CMS 130 can be co-located with the RAN 110.

In an embodiment, a first xApp 120A can be previously onboarded to the RAN 110, wherein the first xApp 120A has been assigned to/associated with controlling a first parameter 212A-n.

CMS 130 can be configured to identify and/or resolve any conflicts between xApps 120A-n adjusting one or more parameters 124A-n. The CMS 130 can include an onboarding component 210 communicatively coupled to a conflict management component (CMC) 220. As part of an onboarding an xApp 120A-n for implementation on the RAN 110, the onboarding component 210 can be configured to utilize the CMC 220 to determine whether the xApp 120A-n should be onboarded, and if so, in what capacity.

CMC 220 can include an assignment component 230 configured to assign respective xApps 120A-n to function as a primary xApp (e.g., a controlling xApp) for operation/adjustment of a parameter 124A-n. CMC 220 can be communicatively coupled to xApp information database 260. xApp info. database 260 can be populated with one or more pairings of xApps 120A-n and parameters 124A-n, wherein the pairings identify a respective primary xApp for a respective parameter 124A-n. For example, xApp 120A is assigned to be the primary xApp for parameter 124A, xApp 120H is assigned to be the primary xApp for parameter 124H, xApp 120*n* is assigned to be the primary xApp for parameter 124*n*, and suchlike.

CMC 220 can further include a lock component 240 configured to (a) determine whether an xApp 120A-n can access/adjust a parameter 124A-n, and (b) in response to a determination that the xApp, e.g., xApp 120B, can access/adjust the parameter, e.g., parameter 124B, lock access to parameter 124B for a duration of time for which xApp 120B is to access/adjust the parameter. xApp info. database 260 can be populated with access information 262A-n, wherein the access information 262A-n can be utilized by the lock component 240 to determine whether a particular parameter 124A-n is available to be adjusted by a particular xApp 120A-n. In the event of the xApp 120A-n can access the parameter, the lock component 240 can apply a lock 245A-n to limit access of the parameter to xApp 120A-n only. For example, one or more parameters 124A-n are identified/configured such that adjustment of the respective parameter 124A-n is not allowed, e.g., a parameter 124C applies functionality to the RAN 110 that cannot be adjusted. Hence, upon receipt of an xApp 120G configured to adjust operation of parameter 124C, the lock component 240 can be configured to access xApp info. database 260, review access information 262C for parameter 124C, and in the event of parameter 124C is configured with a setting of do not adjust/remain constant, CMC 220 can be further configured to initiate a notification 255A-n indicating that xApp 120G is prevented from accessing parameter 124C. As shown in FIG. 2, CMC 220 can further include a notification component 250 communicatively coupled to the lock component 240, whereupon the notification component 250 can be further configured transmit the notification 255C to an entity 127A-n that initiated the xApp 120G instruction to access/adjust parameter 124C. The notification component 250 can be configured to compile/identify information pertinent to the denial of access to parameter 124C enabling the entity 127A-n to subsequently determine why implementation/onboarding of xApp 120G was denied, and further enable entity 127A-n to subsequently generate (if required) an xApp (e.g., xApp 120H) configured in accordance with information provided in notification 255C. It is to be appreciated that any reason may exist for denial of an xApp 120A-n accessing a parameter 124A-n, for example, parameter 124A-n cannot be changed, parameter 124A-n is not a valid parameter for adjustment by the xApp, and suchlike. Alternatively, in response to a determination that the access information 262A-n does not include any limitation of access to the respective parameter 124C, lock component 240 can be configured to provisionally allow access of the xApp 120G to access the parameter 124C and further apply a temporary lock 245C to parameter 124C to prevent another xApp 120D from accessing parameter 124C while xApp 120G is undergoing assessment to determine whether a primary xApp 120A controls operation of the parameter 124C that conflicts with xApp 120G.

By utilizing the various embodiments presented herein, operators of the xApps 120A-n can be notified (e.g., via HMI 188, notifications 255A-n) of the respective xApp 120A-n interactions (whether in conflict, complimentary, etc.) in conjunction with any recommendations (e.g., ML/AI derived) generated by one or more components (e.g., onboarding component 210, CMC 220, parameter lock component 240, comparison component 248, time component 256, and suchlike) presented in the respective embodiments herein. By receiving such notifications 255A-n regarding conflict between two or more to be deployed and/or deployed and operational xApps 120A-n enables operators (e.g., at remote entity 127A) to reconfigure their respective xApps 120A-n in accordance with one or more operational constraints imposed on the RAN 110 by one or more other xApps 120A-n operational on the RAN 110.

Returning to operation of the assignment component 230. In the event of a determination by the lock component 240 that the xApp, e.g., xApp 120G is provisionally allowed to adjust parameter 124C, (e.g., parameter 124C pertains to xApp 120G), a further determination can be required to identify whether parameter 124C is under the control of a primary xApp (e.g., xApp 120A has been assigned to be a primary/controlling xApp for parameter 124C). Accordingly, before xApp 120G can adjust parameter 124C, the effect(s) of the adjustment of parameter 124C by xApp 120G is assessed by a comparison component 248 based on the effect of operation of RAN 110 as a function of a current configuration of parameter 124C by xApp 120A. The assignment component 230 can be configured to provide information (e.g., as a notification 255A-n) regarding xApp 120A, configuration 121A, xApp 120G, proposed configuration 121G, parameter 124C, any KPI's 140A-n and KPM's 145A-n associated with parameter 124C (e.g., impacted by a change in value of parameter 124C and the extended effect across the RAN 110).

The comparison component 248 can be configured to review the information provided in notification 255A by the assignment component 230, e.g., as extracted from the xApp & parameter pairing information 263A-n in the xApp info. database 260. In an embodiment, in the event of, for example, xApp 120A has been assigned to control operation/configuration of parameter 124C, the comparison component 248 can be configured to determine whether application of configuration 121G against parameter 124C would deleteriously affect configuration of parameter 124C applied by xApp 120A. In a first scenario of operation, in response to a determination that xApp 120G would negatively affect a configuration of parameter 124C as applied by xApp 120A, the comparison component 248 can be configured to (a) deny implementation of configuration 121G on parameter 124C, (b) instruct notification component 250 to generate and transmit a notification 255G indicating why implementation of xApp 120G was denied, and/or (c) instruct the lock component 240 to remove the temporary lock 245G applied to parameter 124C to enable parameter 124C to be subsequently accessible to another xApp 120A-n. In a second scenario, in response to a determination that xApp 120G would have no effect and/or a positive effect on a configuration of parameter 124C as applied by xApp 120A, the comparison component 248 can be configured to (a) implement configuration 121G on parameter 124C, (b) instruct notification component 250 to generate and transmit a notification 255G indicating implementation of xApp 120G was enabled, and/or (c) instruct the lock component 240 to remove the temporary lock 245G applied to parameter 124C to enable parameter 124C to be subsequently accessible to another xApp 120A-n.

In an embodiment, the comparison component 248 can be configured to apply AI and ML technology/techniques (e.g., via process component 270 and processes 275A-n) to determine any issues/conflicts that may arise with regard to configuring the parameter 124A-n by a secondary xApp (e.g., xApp 120B) upon a configuration of the parameter applied by the primary xApp (e.g., xApp 120A). Processes 275A-n can include any of operations, functions, workflows, etc., as well as ML and AI techniques/technologies configured to detect xApp 120A-n conflicts.

Processes 275A-n can include one or more Recurrent Neural Network (RNN) models which can be utilized to determine whether a change in a KPI 140A-n results from a conflict between multi-xApps 120A-n, or arises as a function of a change (e.g., natural change) in the operational environment of RAN 110 that is independent of interactions between multi-xApps 120A-n. RNN models in processes 275A-n can also be utilized to forecast a change in performance of a KPI 140A-n, as part of conflict detection by conflict detection component 240. The RIC 150 can be configured to establish correlations between xApp 120A-n actions and change in operational performance of the RAN 110. When multiple xApps 120A-n are working on the same target (e.g., target parameter 124A, per FIG. 2), a prediction of impact on KPIs 140A-n can be a highly complex endeavor, with prediction suitable for implementation of one or more ML techniques in processes 275A-n.

Based on the estimated correlation between xApps 120A-n actions and the performance change of the RAN 110, RIC 150 can identify the xApps 120A-n causing opposite performance direction. To train appropriate ML solutions in processes 275A-n to detect conflicting applications, xApp 120A-n, classification information can be sourced from the aforementioned inputs: KPIs 140A-n and KPMs 145A-n, xApps 120A-n CRTL/CMDs, xApps 120A-n descriptor information (e.g., configuration 121A-n), and suchlike.

In an embodiment, over time, operation of the respective xApps 120A-n and the parameters 124A-n and KPIs 145A-n affected by respective implementation of xApps 120A-n can be monitored (e.g., as part of optimization modelling of RAN 110 by process component 270 and/or comparison component 248). Data generated during monitoring of the RAN 110 can be compiled and stored as operational history 264A-n in the xApp info database 260. Operational history 264A-n can be compiled and stored by any of process component 270, the comparison component 248, the lock component 240, time component 256, and/or the assignment component 230. Understanding of operations and effects derived from an operational history 264A-n of the RAN 110, respective xApps 120A-n can be identified to be given operational control of a respective parameter 124A-n. Hence, over time, process component 270 and/or comparison component 248 can generate understanding of the respective RAN operations to enable the RAN 110 to self-determine operation of the various RAN components, which parameter(s) 124A-n should be assigned to a controlling xApp 120A-n, to improve efficiency and operation of the RAN 110. In an embodiment, prior to an xApp 120A-n being given control of a particular parameter 124A-n, the comparison component 248 can generate an operational report (e.g., a notification 255A-n) detailing why a particular xApp, e.g., xApp 120E should be assigned control of a particular parameter 124E. The operational report 255E can be generated and transmitted to an external entity 127E (e.g., a system engineer overseeing operation of the RAN 110) for approval. An approval notification 128A-n can be received from the external entity 127E (e.g., via I/O comp 186), whereupon the CMS 130, a CMS 130 subcomponent, etc., can assign control of the parameter 124E to the particular xApp, e.g., xApp 120E, such that xApp 120E is now the primary application overseeing operation of the parameter 124E. Further, with xApp 120E being assigned control of parameter 124E, any xApp 120A-D/F-n that was previously assigned as the primary xApp (e.g., xApp 120A) for parameter 124E, the primary status can be terminated/revoked for xApp 120A. The xApp & parameter pairing information 263E can be updated detailing xApp 120E is now the primary xApp for parameter 124E, with xApp 120A no longer functioning as the primary xApp for parameter 124E.

In a further embodiment, CMC 220 can also include a time component 256. Rather than an xApp 120A-n always having control of a parameter 124A-n, control may only be required for a particular period of time. For example, a configuration 121A is only required to be applied to parameter 124A by xApp 120A for a specific period of time during the day, outside of that period of time, parameter 124A can be accessed and adjusted by any xApp 120B-n with no regard for a configuration 121A applied by xApp 120A. A time 257A can be configured (e.g., by entity 127A) and applied to the time component 256 for which xApp 120A-n is operate as a primary xApp for, and controlling adjustment of, parameter 124A-n. Hence, at a first moment in time T2, a request by xApp 120B to adjust parameter 124A is denied by xApp 120A, as the first moment in time coincides with a duration T1 configured in time 257A. However, at a second moment in time, T3, a request by xApp 120B to adjust parameter 124A is approved by xApp 120A. At time T1, the time component 256 can be configured to generate and send (e.g., via notification component 250) a notification 255A to entity 127A indicating that currently xApp 120A is functioning as a primary xApp and adjustment of parameter 124A is denied, however, at time T3, the adjustment of parameter 124A by xApp 120B will be approved.

In another embodiment, a situation can occur where xApp 120A is functioning as a primary xApp but the adjustment of parameter 124A by xApp 120B has been approved as the value applied to parameter 124A by a configuration 121B of xApp 120B was determined (e.g., by comparison component 248) to not negatively affect operation of xApp 120A regarding parameter 124A. Subsequently, an operational requirement of xApp 120A changes such that a configuration 121A (e.g., having a first value at a time T1) initially applied by xApp 120A when xApp 120B was approved to adjust parameter 124A subsequently changes (e.g., to a second value at a time T2). In such an event, with xApp 120A still identified as the primary xApp, the comparison component 248 can be configured to review a current value of parameter 124A (e.g., as set by xApp 120B at time T) to determine whether the current value of parameter 124A positively/negatively affects the operational configuration of xApp 120A at time T2. In the event of the current setting of parameter 124A at time T2 by xApp 120B negatively affects an operational requirement of xApp 120A, comparison component 248 can be configured to apply (e.g., overwrite) the current value of parameter 124A (e.g., as configured by xApp 120B and configuration 121B) with the new configuration 121A of xApp 120A.

In a further embodiment, an entity 127A-n can determine that assignment of a first xApp, e.g., xApp 120A, to be a primary xApp controlling access/adjustment of a parameter, e.g., parameter 124A, is detrimental to operation of the RAN. The entity, e.g., entity 127A can generate an instruction 128A instructing the assignment component 230 to remove assignment of xApp 120A as primary xApp for parameter 124A. In response to receiving instruction 128A, assignment component 230 can unassign xApp 120A being the primary xApp for parameter 124A and further update the xApps and parameter pairings list 263A-n to reflect the change in status of xApp 120A regarding parameter 124A. Similarly, entity 127A can identify an xApp 120D is to function as primary xApp for parameter 124A, entity 127A can generate an instruction 128B instructing the assignment component 230 to assign xApp 120D as primary xApp for parameter 124A. In response to receiving instruction 128B, assignment component 230 can assign xApp 120A as primary xApp for parameter 124A and further update the xApps and parameter pairings list 263A-n to reflect the assignment of xApp 120A to parameter 124A.

Figure 3:
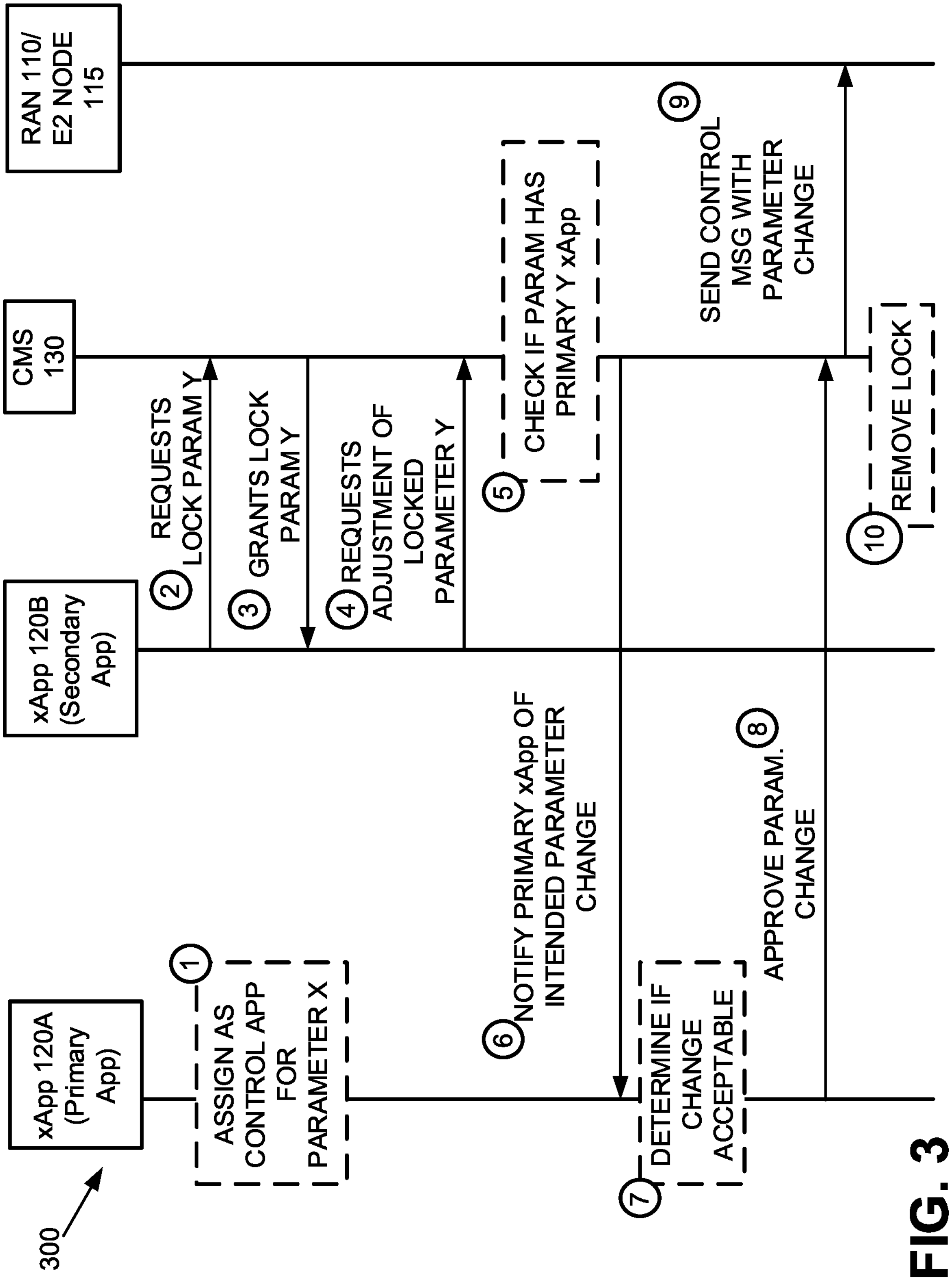
FIG. 3 presents a process diagram illustrating respective stages in addressing a potential xApp conflict, in accordance with one or more embodiments.

Turning to FIG. 3, process diagram 300 illustrates respective stages in addressing a potential xApp conflict, in accordance with one or more embodiments. In an embodiment, the example scenario represents operation of an xApp 120B (secondary xApp) that has been deployed for operation on a RAN 110, whereby control of adjustment of a parameter 124A has been assigned to first xApp 120A (primary xApp).

At FIG. 3 (1), xApp 120A is assigned as a primary xApp configured to control adjustment of a parameter 124A (parameter X). Assignment can be via an instruction (not shown) provided to the assignment component 230, whereby the instruction can be included in the xApp 120A during an initial onboarding to the RAN 110, provided in a request from entity 127A, and suchlike. As part of the assignment function, a configuration 121A included with xApp 120A is applied to parameter 124A, hence, parameter 124A is now operating in accordance with xApp 120A.

At FIG. 3 (2), xApp 120B is undergoing onboarding to the RAN 110, whereby the xApp 120B includes a configuration 121B to adjust operation of a parameter 124B (parameter Y). As part of an initial onboarding process, configuration 121B can be reviewed by lock component 240 to identify parameter 124B of interest to xApp 120B. Lock component 240 in CMS 130 can be configured to review an access info. list 262A-n of parameters operating in RAN 110 to determine whether xApp 120B can access the parameter 124B, and further, limit access to parameter 124B to only xApp 120B.

At FIG. 3 (3), in response to a determination that access to parameter 124B is not limited (e.g., based on review of the access info list 262A-n by the lock component 240), access to parameter 124B can be locked (e.g., by lock 245B) such that another xApp 120C (e.g., a third xApp) cannot access parameter 124B as further review of interaction by xApp 120B and parameter 124B is undertaken.

At FIG. 3 (4), as part of an onboarding process, with parameter 124B locked, xApp 120B requests adjustment of parameter 124B, e.g., via configuration 121B.

At FIG. 3 (5), the configuration 121B of xApp 120B can be reviewed to determine whether configuration 121B can be applied by xApp 120B. Review can be performed by assignment component 230 in conjunction with xApp and parameter pair list 263A-n. Assignment component 230 identifies that parameter 124B and parameter 124A are the same parameter, with parameter 124A previously assigned to xApp 120A.

At FIG. 3 (6), the assignment component 230 notifies xApp 120A of the request by xApp 120B to configure parameter 124A.

At FIG. 3 (7), the comparison component 248 can review operation of xApp 120A to determine whether the configuration change requested by xApp 120B can be applied to parameter 124A. In an embodiment, xApp 120B/configuration 121B can be executed by the comparison component 248 as a background operation to determine the effect(s) of applying configuration 121B to parameter 124A on operation of RAN 110 and further, on operation of xApp 120A. Effectively, by executing xApps 120A and 120B as background operations with respective configurations 121A and 121B implemented, xApp 120A is self-determining whether xApp 120B should be implemented. In an embodiment, process component 270 and AI/ML processes 275A-n can supplement operation of the comparison component 248 in determining/identifying the effect of applying configuration 121B to parameter 124A.

At FIG. 3 (8), in response to a determination by the comparison component 248 that application of configuration 121B does not negatively impact functionality provided by xApp 120A, xApp 120B and configuration 121B can be applied to parameter 124A.

At FIG. 3 (9), xApp 120B is onboarded (e.g., by onboarding component 210), with a control message (e.g., notification 255A) generated and applied to RAN 110, wherein the control message is configured to apply configuration 121B to parameter 124A.

At FIG. 3 (10), lock component 240 can be configured to remove the lock 245A on parameter 124A to enable parameter 124A to be subsequently reconfigured by application of another xApp 120A-n.

As mentioned, various processes 275A-n can be configured to determine information, make predictions, etc., regarding operational conflict between primary and secondary xApps 120A-n. As previously mentioned, the processes 275A-n can include AI, ML and reasoning techniques/technologies that employ probabilistic and/or statistical-based analysis to prognose or infer an action that a user desires to be automatically performed. The various embodiments presented herein can utilize various ML-based schemes for carrying out various aspects thereof, e.g., potential conflict between a first xApp 120A and a second xApp 120B, and further, conflicts between respective xApps 120A-n implemented on the RAN 110, which as mentioned, can be facilitated via an automatic classifier system and process.

As used herein, the terms "predict", "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In the various embodiments presented herein, the CMS 130 can obtain operational data (e.g., configurations 121A-n, KPIs 140A-n, KPMs 145A-n, historical data 264A-n) from the xAPPs 120A-n regarding the parameters, metrics, use cases, etc., that the respective xAPP 120A-n is configured to control/adjust. The processes 275A-n can include AI, ML and reasoning techniques/technologies that employ probabilistic and/or statistical-based analysis to prognose or infer an action that a user desires to be automatically performed. The various embodiments presented herein can utilize various ML-based schemes for carrying out various aspects thereof, e.g., determining presence of conflicts between xAPPs 120A-n, as previously mentioned herein, can be facilitated via an automatic classifier system and process.

A classifier is a function that maps an input attribute vector, x=(x1, x2, x3, x4, xn), to a class label class (x). The classifier can also output a confidence that the input belongs to a class, that is, f(x)=confidence (class (x)). Such classification can employ a probabilistic and/or statistical-based analysis (e.g., factoring into the analysis utilities and costs) to prognose or infer an action that a user desires to be automatically performed (e.g., conflict resolution between xApps 120A-n).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing behavior of xApps 120A-n, RAN 110 behavior, receiving extrinsic information, and suchlike). For example, SVM's are configured via a learning or training phase within a classifier constructor and feature selection module. Thus, the classifier(s) can be used to automatically learn and perform a number of functions, including but not limited to determining according to predetermined criteria, e.g., whether an operational conflict exists, performance of KPIs 140A-n, operational goal(s) of respective xApps 120A-n, direct conflicts, indirect conflicts, implicit conflicts, and suchlike.

As described supra, inferences can be made, and operations performed, based on numerous pieces of information. For example, information/data (e.g., configurations 121A-n) regarding implementing xApps 120A-n, historical usage, predicted usage, etc., as operation of the xApps 120A-n continues, enabling analysis to determine converging patterns such that inferences can be made regarding powering conflict between respective xApps 120A-n.

Figure 4:
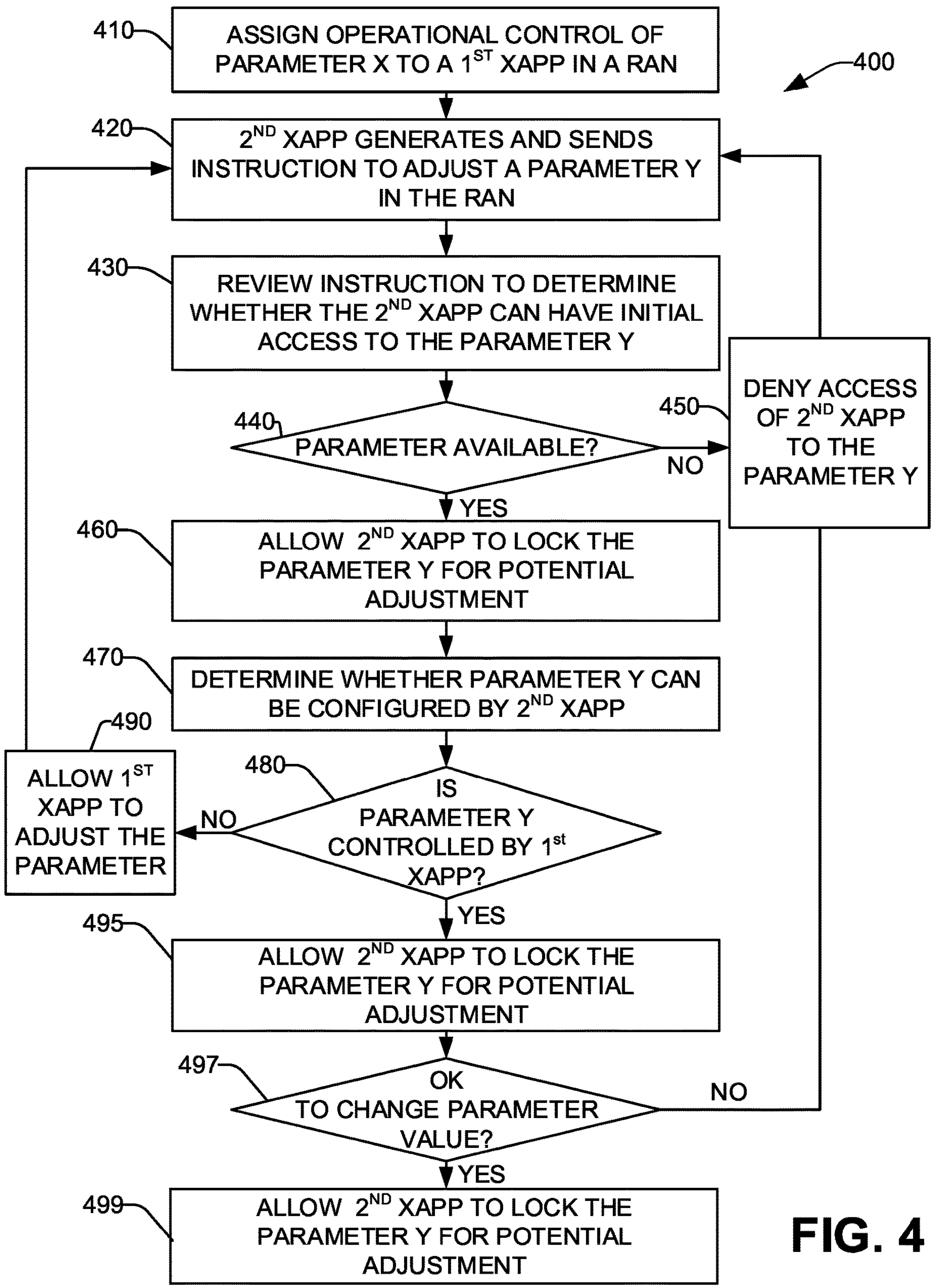
FIG. 4 illustrates a computer-implemented methodology for determining whether an operational conflict arises by implementing an xApp on a RAN, in accordance with one or more embodiments described herein.

FIG. 4, illustrates a computer-implemented methodology 400 for determining whether an operational conflict arises by implementing an xApp on a RAN, in accordance with one or more embodiments described herein.

At 410, a first xApp (e.g., xApp 120A) can be assigned control by an assignment component (e.g., an assignment component 230) of a parameter X (e.g., a control parameter 212X). Parameter X can be associated with controlling/associated with one or more operations/functionality/processes/etc., at a RAN (e.g., RAN 110). In an embodiment, assignment of parameter X to the first xApp can be performed by an external entity (e.g., entity 127A such as a human operator overseeing operation of the RAN). In another embodiment, assignment of parameter X to the first xApp can be performed by one or more AI/ML processes (e.g., processes 275A-n implemented by process component 270) configured to monitor operation of the RAN and further configured to determine relationships between parameters and respective xApps such that one or more inferences can be made regarding optimal operation of the RAN, whereby a particular xApp should be assigned control of a parameter with adjustment of the parameter, e.g., by a second xApp, being assessed against a required configuration of the first xApp.

At 420, a second xApp (e.g., xApp 120B) is generated/received and comprises a second configuration (e.g., configuration 121B) to adjust a parameter Y (e.g., e.g., a control parameter 212Y), wherein parameter Y can be included in controlling/associated with one or more operations/functionality/processes/etc., at a RAN (e.g., RAN 110). In an example scenario, the instruction can comprise "set parameter Y to a value of V". At this moment, it is unknown whether parameter X (e.g., assigned to/configured by the first xApp) and parameter Y (e.g., to be configured by the second xApp) are the same parameter, or parameter X and parameter Y are dissimilar (e.g., parameter 212X=parameter 212Y?).

At 430, the second xApp with second configuration can be received by a conflict management system (e.g., CMS 130), wherein the conflict management system can further include a conflict management component (e.g., CMC 140). The CMC can include a lock component (e.g., lock component 240) configured to parse the configuration of the second xApp and further configured to reference an access database (e.g., access info. list 262A-n) to determine whether the configuration for parameter Y pertains to a parameter (e.g., any of parameters 124A-n) for which the second xApp is permitted to access and/or adjust. As previously mentioned, the access information can comprise a listing of respective parameters that can/cannot be accessed/adjusted by a particular xApp.

At 440, in response to a determination by the lock component that NO, the second xApp is not granted/allowed to access parameter Y identified in the instruction, methodology 400 can advance to 450, whereupon the lock component can be configured to generate and transmit an access denied notification (e.g., notification 255Y via notification component 250) to the second xApp. Methodology 400 can further return to act 420 for the next/subsequent instruction to be received from an xApp at the CMC.

At 440, in response to a determination by the lock component that YES, the second xApp is granted access to parameter Y identified in the instruction, methodology 400 can advance to 460. At 460, the lock component can be configured to lock access (e.g., provisionally/temporarily) to parameter Y for potential adjustment by the second xApp. Accordingly, while adjustment of parameter Y is being assessed for the second xApp, no other xApps (e.g., xApps 120C-n) are granted access to adjust parameter Y.

At 470, the assignment component can be configured to determine whether parameter Y of interest to the second xApp is controlled by the first xApp, e.g., parameter Y and parameter X are the same parameter, and parameter X has been previously assigned to the first xApp. In an embodiment, the assignment component can be configured to access a database listing parameters paired with xApps (e.g., xApp & parameter pairings 263A-n in xApp info. database 260). As previously described, the xApp & parameter pairings database can identify respective xApps and one or more parameters for which each xApp has been identified/assigned as being the primary xApp controlling operation of the respective parameter.

At 480, in response to a determination by the assignment component that NO, parameter Y and parameter X are not the same parameter, methodology 400 can advance to 490, whereupon the second xApp is allowed to adjust the setting of parameter Y. Methodology 400 can return to 420 for the next instance of an xApp requesting access to adjust a parameter.

At 480, in response to a determination by the assignment component that YES, parameter Y and parameter X are the same, and accordingly, adjustment of parameter Y is controlled by the first xApp, methodology 400 can advance to 495.

At 495, a comparison component (e.g., comparison component 248 and/or conjunction with process component 270) can be configured to review the configuration (e.g., parameter value 212Y) that the second xApp is configured to apply to parameter X (where, as previously mentioned, parameter X=parameter Y), to determine the impact of applying the configuration required by the second xApp to parameter X, e.g., does the adjustment of parameter X by the second xApp have a positive impact, a negative impact, no impact, and suchlike, on the operation of the first xApp and parameter X?

At 497, in response to a determination by the comparison component that NO, application of the value has a negative impact on operation of the first xApp and the utilization of parameter X, methodology 400 can advance to 450, where adjustment of parameter X by the second xApp is denied, and further, the lock operation of parameter Y by the second xApp can be lifted (e.g., by lock component 240). Methodology 400 can return to 420 for a subsequent instruction in xApp 120A-n to be received and reviewed.

At 497, in response to a determination by the comparison component that YES, application of the value is acceptable regarding operation of the first xApp (e.g., value adjustment positively impacts operation of the first xApp, operation of the RAN, has no impact on operation of the first xApp, and suchlike), methodology 400 can advance to 499. At act 499, the value to be applied by the second xApp can be applied to parameter X (where parameter Y and parameter X are the same parameter). Methodology can return to 420 for a subsequent instruction in xApp 120A-n to be received and reviewed.

Figure 5:
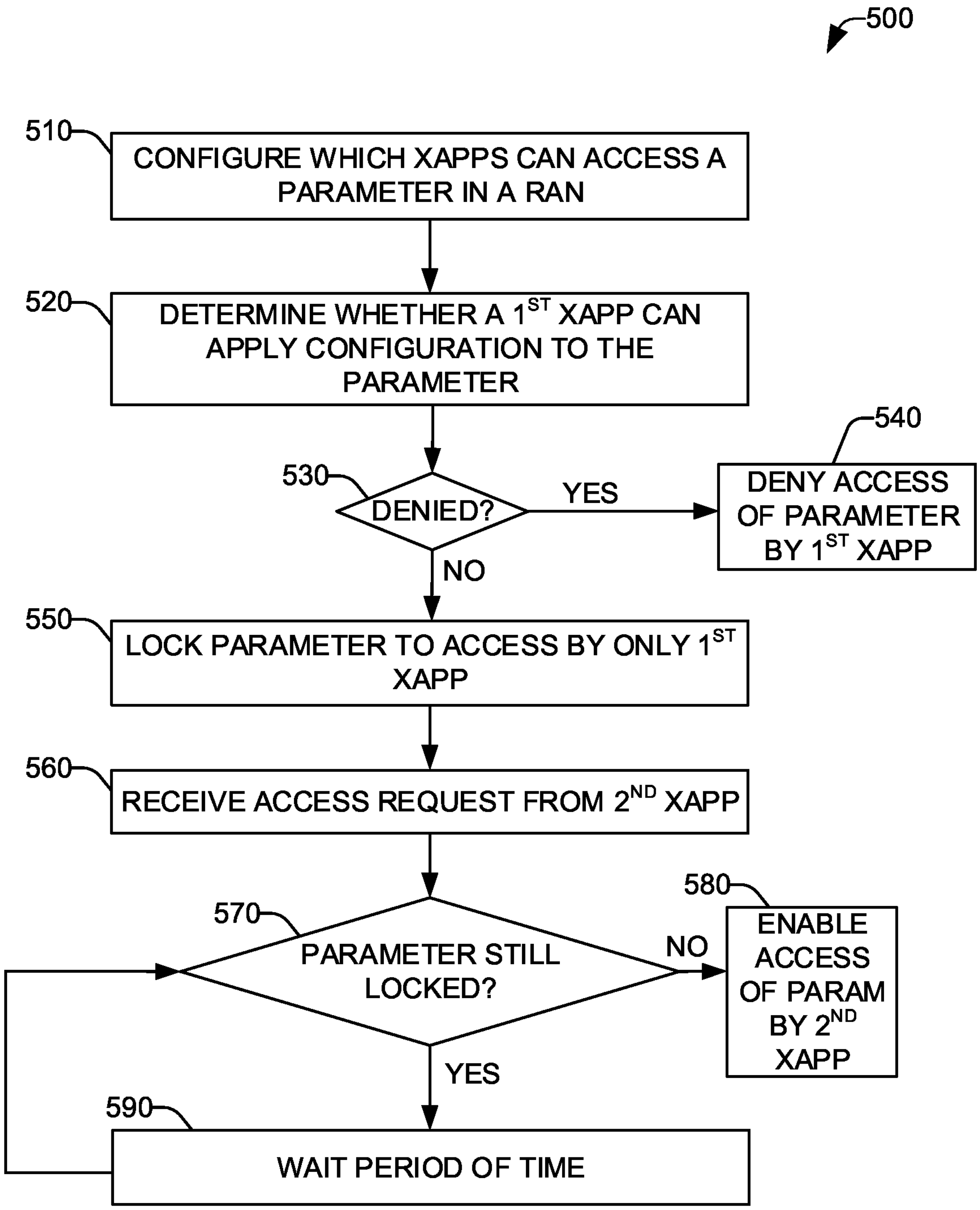
FIG. 5 illustrates a computer-implemented methodology for determining access to a parameter by an xApp on a RAN, in accordance with one or more embodiments described herein.

FIG. 5, illustrates a computer-implemented methodology 500 for determining access to a parameter by an xApp on a RAN, in accordance with one or more embodiments described herein.

At 510, various parameters (e.g., parameters 124A-n) can be configured to be operational across a RAN (e.g., RAN 110), wherein respective value settings and configurations applied to the respective parameter can control operation of the RAN as previously described. Based on how the various parameters are implemented/utilized, a first subset of the parameters can be accessed and configured by one or more xApps (e.g., xApps 120A-n) while a second subset of parameters are to remain unchanged/fixed setting and are not available to be accessed/configured by one or more xApps. An access information list (e.g., access info list 262A-n) can be configured/populated with respective parameters and their accessibility. A lock component (e.g., lock component 240) can be utilized to populate the access information list.

At 520, onboarding of a first xApp (e.g., xApp 120B) can be initiated (e.g., by onboarding component 210), wherein the first xApp includes a configuration (e.g., configuration 121B) to adjust a setting of a parameter (e.g., parameter 124B). As part of the onboarding process, the lock component can be configured to review the access information list to determine whether first xApp is permitted to access/adjust the parameter.

At 530, in response to a determination by the lock component that YES, the parameter is present in the access information list, and further, the first xApp is not permitted to access the parameter, methodology 500 can advance to 540, whereupon the lock component can be further configured to deny access of the parameter by the first xApp. Accordingly, the first xApp does not have the capability to access the parameter.

At 530, in response to a determination by the lock component that NO, the parameter is not present in the access information list or the parameter is present by first xApp is not denied access of the parameter, methodology 500 can advance to 550, whereupon the lock component can be configured to apply a lock (e.g., lock 245B) that limits access of the parameter to only the first xApp. In an embodiment, the access information list can be updated by the lock component to indicate that the parameter is currently in a temporary locked status with only the first xApp being granted access. Accordingly, the first xApp has the capability to access the parameter.

At 560, a request to access/configure the parameter can be received as part of an onboarding request by a second xApp. The lock component can be configured to review whether the lock is still applied to the parameter for the first xApp?

At 570, in response to a determination by the lock component that NO, the parameter no longer has a temporary locked status (e.g., owing to processing of the first xApp with the parameter), methodology 500 can advance to 580, whereupon the second xApp can be granted to access the parameter.

At 570, in response to a determination by the lock component that YES, the parameter is still temporarily locked for the first xApp, methodology 500 can advance to 590, whereupon a defined period of time (e.g., either a fixed duration, a time it takes for the first xApp to configure the parameter, etc.) is to elapse, per a timer in the lock component. While the duration of time is to elapse, methodology 500 can return to 570, whereupon a further determination can be performed to determine whether the parameter is still in a locked state with the first xApp.

Figure 6:
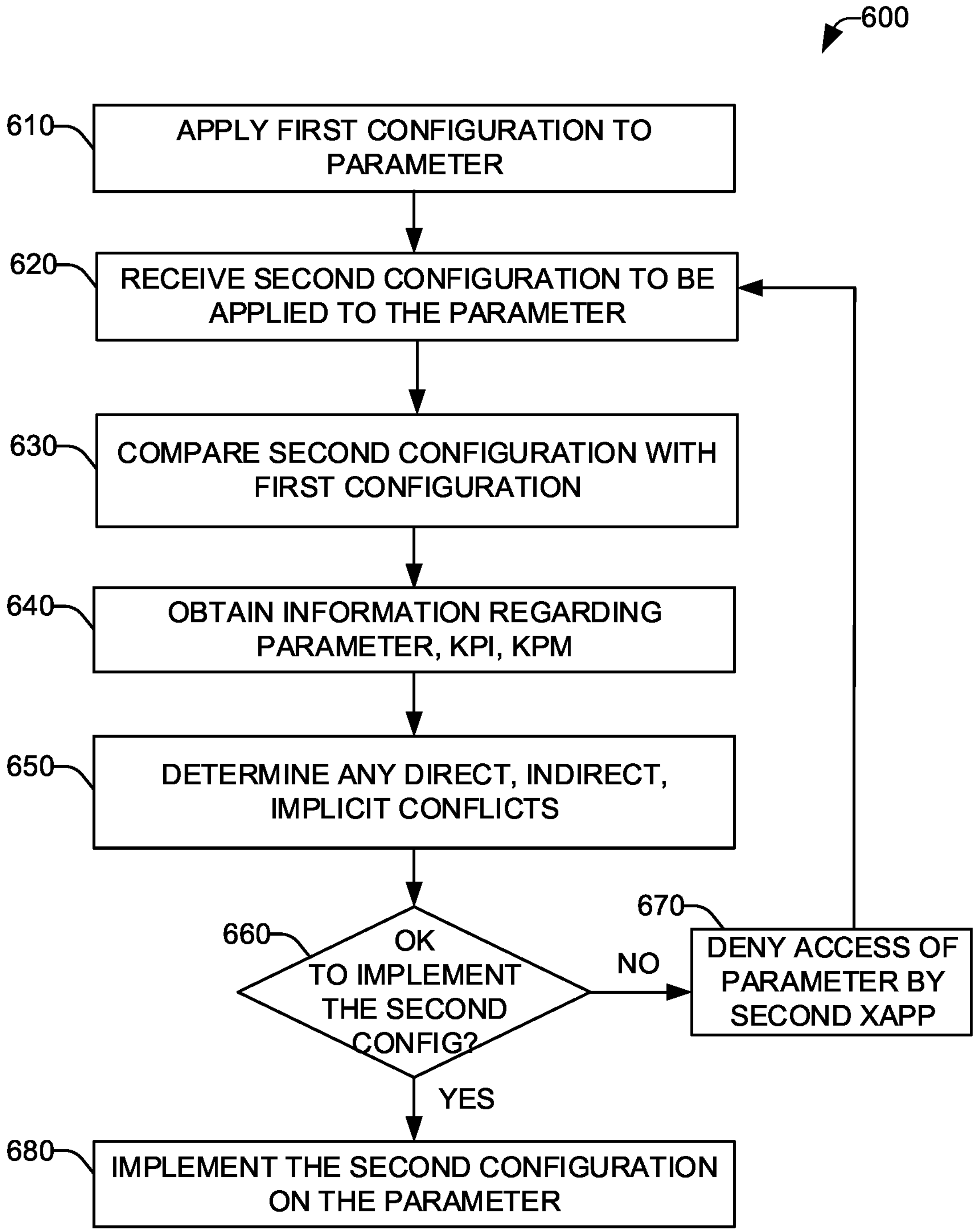
FIG. 6 illustrates a computer-implemented methodology for identifying one or more conflicts between application of a first configuration on a parameter and a second configuration on the parameter, in accordance with one or more embodiments described herein.

FIG. 6, illustrates a computer-implemented methodology 600 for identifying one or more conflicts between application of a first configuration on a parameter and a second configuration on the parameter, in accordance with one or more embodiments described herein.

At 610, a first configuration (e.g., configuration 121A) can be applied to a parameter (e.g., parameter 124A) by a first xApp (e.g., xApp 120A). In an example scenario, the first xApp has been onboarded at a RAN (e.g., RAN 110 by onboarding component 210) with the first configuration applied to the parameter. As previously mentioned, the first xApp can be identified as a primary xApp configured to control operation/adjustment of the parameter.

At 620, a second configuration (e.g., configuration 121B) is received at the RAN as part of an onboarding process for a second xApp (e.g., xApp 120B). As previously described, a determination can be made (e.g., by an assignment component 230) that the first xApp and the second xApp both include respective configurations directed to adjust the same parameter.

At 630, a comparison component (e.g., comparison component 248) can be configured to compare the second configuration with the first configuration. For example, the first xApp can be designed to achieve a particular operation of the RAN, while the second xApp can be designed to achieve another operation of the RAN. The comparison component can be configured to determine whether the second configuration negatively or positively impacts the first configuration, and accordingly, achievement of a particular operation of the RAN by the first xApp.

At 640, the comparison component can be configured to obtain information pertaining to operation of the parameter and/or operation of the first xApp, whereby information can include parameter information, information regarding one or more KPIs and/or KPMs (e.g., KPIs 140A-n, KPMs 145A-n) associated with the parameter, etc.

At 650, in an embodiment, the comparison component can utilize various AI/ML processes (e.g., processes 275A-n implemented by process component 270 operating with the comparison component 248) to determine/infer respective conflicts, etc., that may arise by implementation of the second configuration relative to the operation of the RAN by the first xApp. As previously mentioned, the conflicts can include direct, indirect, and/or implicit conflicts.

At 660, in response to a determination/inference by the comparison component that NO, it is not OK to implement the second configuration as an unwanted conflict would arise by implementing the second configuration, methodology 600 can advance to 670, whereupon the comparison component can be configured to deny adjustment/access of the parameter by the second xApp. Methodology 600 can return to 620, whereupon another configuration of the parameter can be subsequently received for review of conflict with the first configuration.

At 660, in response to a determination/inference by the comparison component that YES, it is OK to implement the second configuration as the second configuration is in accordance with operation of the first xApp, methodology 600 can advance to 680, whereupon the comparison component can be configured to allow adjustment/access of the parameter by the second xApp. Methodology 600 can return to 620, whereupon another configuration of the parameter can be subsequently received for review of conflict with the first configuration.

Figure 7:
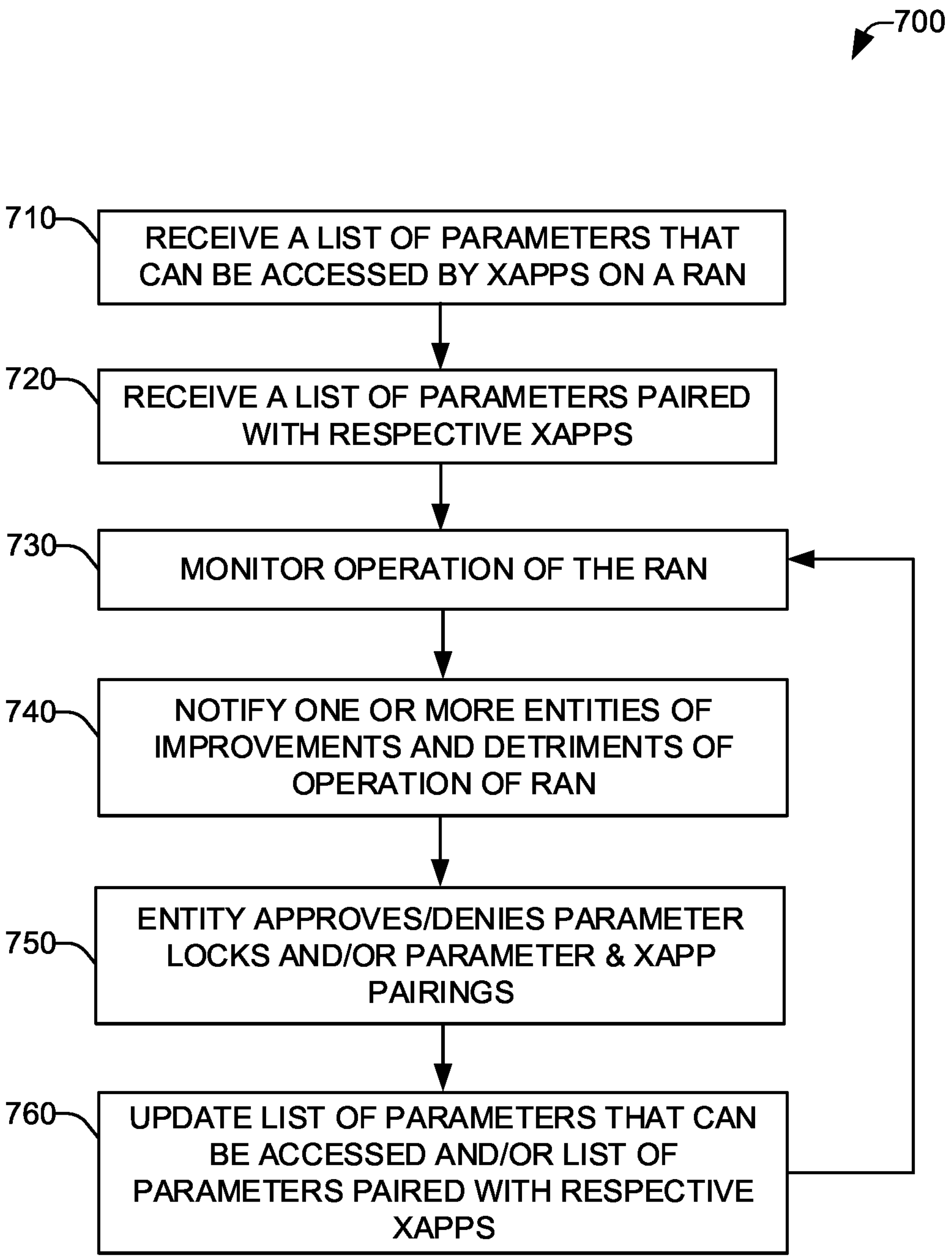
FIG. 7 illustrates a computer-implemented methodology for updating respective parameter and xApp configurations, in accordance with one or more embodiments described herein.

FIG. 7, illustrates a computer-implemented methodology 700 for updating respective parameter and xApp configurations, in accordance with one or more embodiments described herein.

At 710, an access information list (e.g., access info list 262A-n) can be received by a lock component (e.g., lock component 240) and stored in a database (e.g., xApp info database 260), wherein the access information list details parameters (e.g., parameters 124A-n) that can/cannot be accessed by one or more xApps (e.g., xApps 120A-n) during operation of a RAN (e.g., RAN 110).

At 720, an xApp and parameter pairing list (e.g., xApp and parameter pairing list 263A-n) can be received by an assignment component (e.g., assignment component 230) and stored in the database.

At 730, operation of the RAN, the xApps, parameters, etc., can be monitored, e.g., as part of (a) determining whether an xApp is approved/denied access to a parameter (e.g., as part of a locking operation performed by lock component 240, as previously described), (b) determination of whether a configuration can be applied to a parameter that does not conflict with operation of another xApp (e.g., as part of assignment component 230 determining whether a second xApp can adjust a parameter controlled by a first xApp), and suchlike. As previously mentioned, various AI/ML technologies and techniques can be applied (e.g., by process component 270 and processes 275A-n) during the respective operations, wherein conflicts can be identified that may not readily present themselves to a designer/operator of the RAN. Accordingly, application of the respective AI/ML technologies may reveal (a) access deny/approve scenarios, (b) parameter and xApp pairings, and suchlike that can improve operation of the RAN. Operational history (e.g., operational history data 264A-n) of the RAN can be compiled and stored by any of the process component, the comparison component, the lock component, the time component, and/or the assignment component (e.g., any of process component 270, the comparison component 248, the lock component 240, time component 256, and/or the assignment component 230).

At 740, one or more notifications (e.g., notifications 255A-n) can be generated (e.g., by notification component 250 in response to instruction by any of the assignment component 230, the lock component 240, the comparison component 248, the process component 270, time component 256, and suchlike) and transmitted to an entity (e.g., any of entities 127A-n) tasked with conducting one or more operations pertaining to the RAN.

At 750, the entity can review the one or more notifications, and based thereon, generate instructions (e.g., in notifications 128A-n) to approve/deny access pairings, parameter locks, etc., generated by the AI/ML technologies, etc.

At 760, in response to entity feedback, the access information list, and the xApp and parameter pairing list can be respectively updated to convey the various pairings and locks approved/denied in the entity feedback. Methodology 700 can return to 730 for subsequent further monitoring of the RAN.

Figure 8:
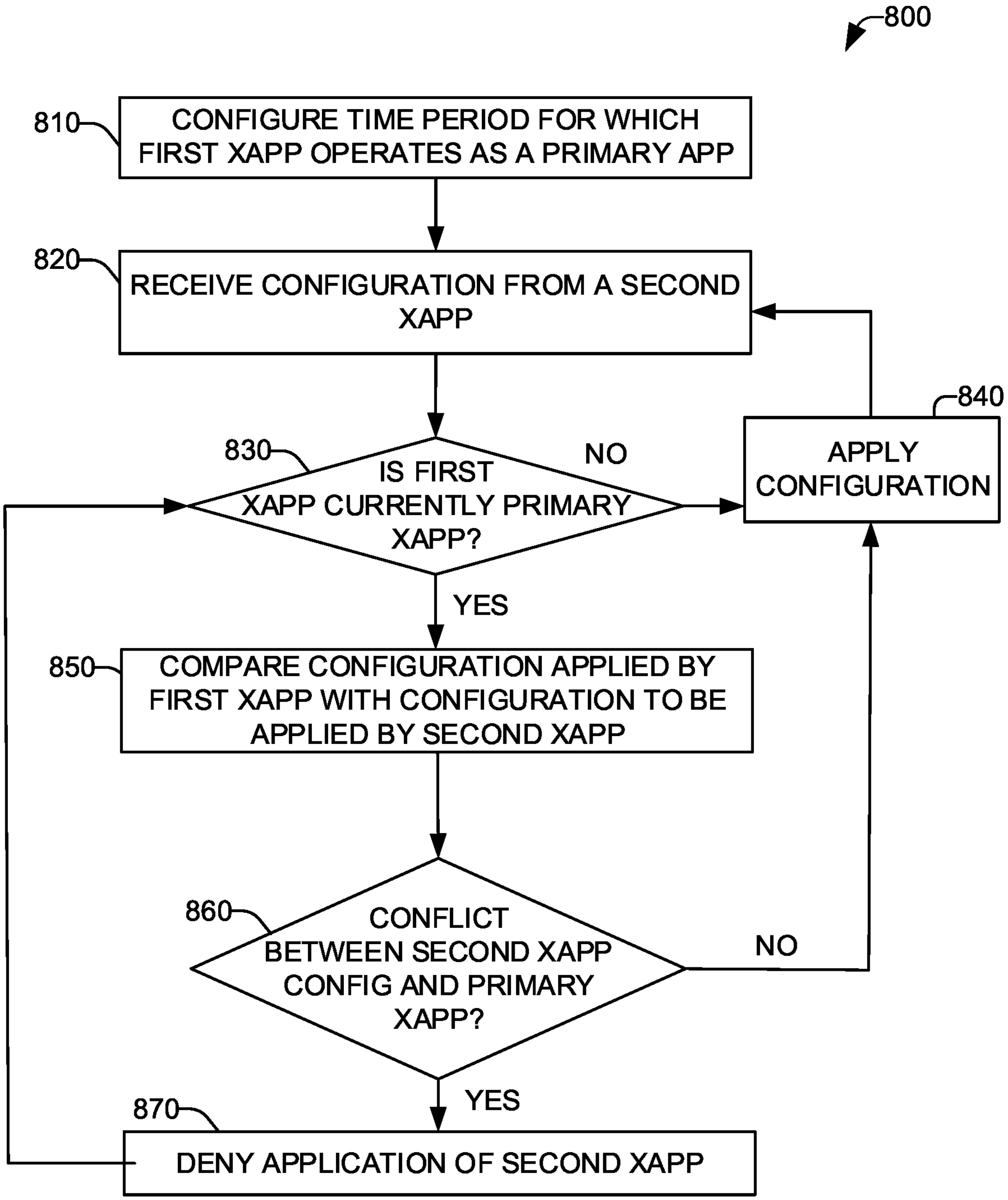
FIG. 8 illustrates a computer-implemented methodology 800 for implementing an xApp as a primary xApp as a function of time, in accordance with one or more embodiments described herein.

FIG. 8 illustrates a computer-implemented methodology 800 for implementing an xApp as a primary xApp as a function of time, in accordance with one or more embodiments described herein.

At 810, a first xApp (e.g., xApp 120A) can be configured at a time component (e.g., time component 256) to function as a primary xApp during a defined period of time T1 (e.g., time 257A). Configuration of the period of time T1 by the time component can be in response to an instruction (e.g., notification 128A-n) received from an entity (e.g., entity 127A).

At 820, a configuration (e.g., configuration 121B) from a second xApp (e.g., xApp 120B) can be received at time T2 and processed by a lock component (e.g., lock component 240) and/or a comparison component (e.g., comparison component 248), wherein the configuration is to apply a value to a parameter (e.g., parameter 124A) which is/has been controlled by the primary xApp.

At 830, a determination can be made (e.g., by lock component 240 or comparison component 248) regarding whether the first xApp is currently controlling the parameter. In response to a determination of NO, the first xApp is not currently configured to function as a primary xApp, e.g., T2≠T1, methodology 800 can advance to 840, whereupon the configuration from the second xApp can be applied to the parameter. Methodology 800 can return to 820 for the next configuration to be received and a subsequent determination of whether the first xApp is functioning as a primary xApp.

At 830, in response to a determination that YES, the first xApp is currently operating as a primary xApp, methodology 800 can advance to 850, where a comparison can be performed (e.g., by comparison component 248) regarding whether a conflict exists between an operational configuration (e.g., of the parameter) applied by the first xApp and the configuration to be implemented by the second xApp.

At 860, in response to a determination of NO, a conflict does not exist, methodology 800 can return to 840, whereupon the configuration from the second xApp can be applied to the parameter. Methodology 800 can return to 820 for the next configuration to be received and a subsequent determination of whether the first xApp is functioning as a primary xApp.

At 860, in response to a determination of a YES, a conflict does exist, methodology 800 can advance to 870, whereupon the configuration from the second xApp can be denied implementation on the parameter. Methodology 800 can return to 830 for a subsequent determination of whether the first xApp is functioning as a primary xApp.

5. Example Environments of Use

Figure 9:
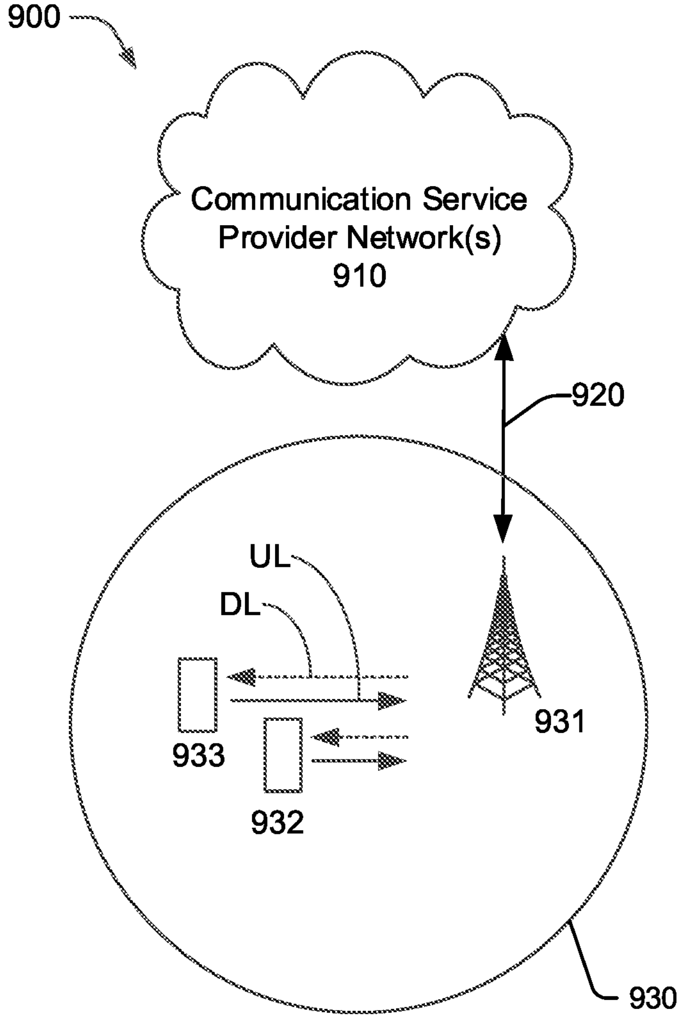
FIG. 9 illustrates an example wireless communication system, in accordance with one or more embodiments described herein.

FIG. 9 illustrates an example wireless communication system 900, in accordance with one or more embodiments described herein. The example wireless communication system 900 comprises communication service provider network(s) 910, a network node 931, and user equipment (UEs) 932, 933. A backhaul link 920 connects the communication service provider network(s) 910 and the network node 931. The network node 931 can communicate with UEs 932, 933 within its service area 930. The dashed arrow lines from the network node 931 to the UEs 932, 933 represent downlink (DL) communications to the UEs 932, 933. The solid arrow lines from the UEs 932, 933 to the network node 931 represent uplink (UL) communications.

In general, with reference to FIG. 9, the non-limiting term "user equipment" can refer to any type of device that can communicate with network node 931 in a cellular or mobile communication system 900. UEs 932, 933 can have one or more antenna panels having vertical and horizontal elements. Examples of UEs 932, 933 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 932, 933 can also comprise IoT devices that communicate wirelessly.

In various embodiments, system 900 comprises communication service provider network(s) 910 serviced by one or more wireless communication network providers. Communication service provider network(s) 910 can comprise a "core network". In example embodiments, UEs 932, 933 can be communicatively coupled to the communication service provider network(s) 910 via a network node 931. The network node 931 can communicate with UEs 932, 933, thus providing connectivity between the UEs 932, 933 and the wider cellular network. The UEs 932, 933 can send transmission type recommendation data to the network node 931. The transmission type recommendation data can comprise a recommendation to transmit data via a closed loop multiple input multiple output (MIMO) mode and/or a rank-1 precoder mode.

Network node 931 can have a cabinet and other protected enclosures, computing devices, an antenna mast, and multiple antennas for performing various transmission operations (e.g., MIMO operations) and for directing/steering signal beams. Network node 931 can comprise one or more base station devices which implement features of the network node. Network nodes can serve several cells, depending on the configuration and type of antenna. In example embodiments, UEs 932, 933 can send and/or receive communication data via wireless links to the network node 931.

Communication service provider networks 910 can facilitate providing wireless communication services to UEs 932, 933 via the network node 931 and/or various additional network devices (not shown) included in the one or more communication service provider networks 910. The one or more communication service provider networks 910 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 900 can be or comprise a large-scale wireless communication network that spans various geographic areas. According to this implementation, the one or more communication service provider networks 910 can be or comprise the wireless communication network and/or various additional devices and components of the wireless communication network (e.g., additional network devices and cell, additional UEs, network server devices, etc.).

The network node 931 can be connected to the one or more communication service provider networks 910 via one or more backhaul links 920. The one or more backhaul links 920 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 920 can also comprise wireless link components, such as but not limited to, line-of-sight (LOS) or non-LOS links which can comprise terrestrial air-interfaces or deep space links (e.g., satellite communication links for navigation). Backhaul links 920 can be implemented via a "transport network" in some embodiments. In another embodiment, network node 931 can be part of an integrated access and backhaul network. This may allow easier deployment of a dense network of self-backhauled 5G cells in a more integrated manner by building upon many of the control and data channels/procedures defined for providing access to UEs 932, 933.

Wireless communication system 900 can employ various cellular systems, technologies, and modulation modes to facilitate wireless radio communications between devices (e.g., the UEs 932, 933 and the network node 931). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 900 can operate in accordance with any 5G, next generation communication technology, or existing communication technologies, various examples of which are listed supra. In this regard, various features and functionalities of system 900 are applicable where the devices (e.g., the UEs 932, 933 and the network node 931) of system 900 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 900 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 9 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 10:
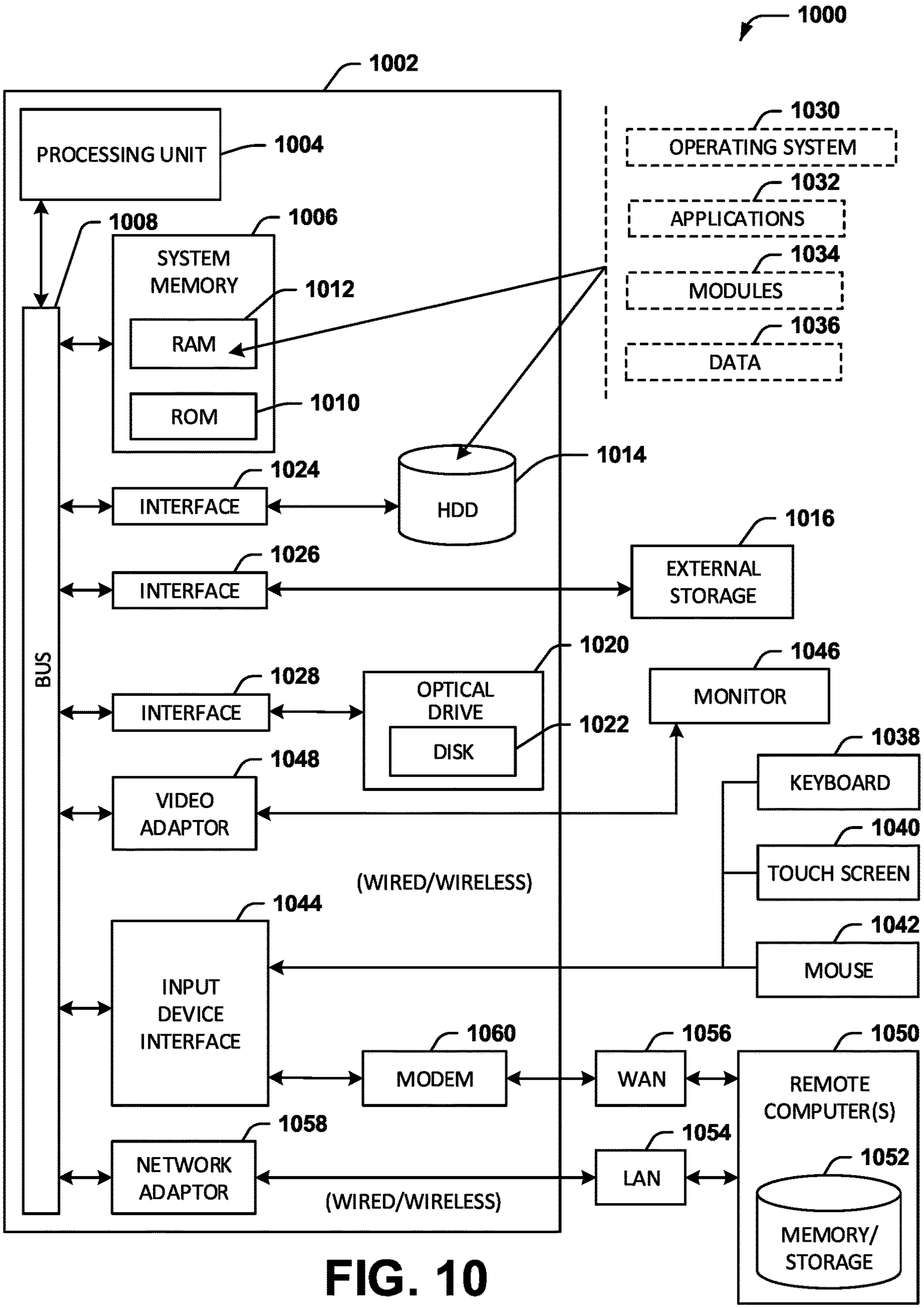
FIG. 10 presents an example environment for implementing various embodiments presented herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1050 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1050 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1094 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive-in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities. The terms "set" and "group" are used interchangeably herein.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G, O-RAN, or other generation networks, the disclosed aspects are not limited to 5G or O-RAN implementations, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, from a first extended application (xApp) and by a device comprising a processor, a request to configure a control parameter, wherein the control parameter is configured to control operation of a process of network equipment that is part of a radio access network (RAN);

determining, by the device, whether adjustment of the control parameter is controlled by a second xApp that has been assigned as a primary xApp for the control parameter;

determining, by the device, whether the second xApp has granted permission for the first xApp to adjust the control parameter based on an assessment of whether a first configuration requested by the first xApp would negatively impact a second configuration of the control parameter applied by the second xApp; and in response to the determining whether the second xApp has granted the permission indicating that the second xApp has granted the permission for the first xApp to adjust the control parameter, adjusting, by the device, the control parameter in accordance with the request received from the first xApp.

2. The method of claim 1, further comprising:

in response to the determining whether the second xApp has granted the permission indicating that the second xApp has denied the permission for the first xApp to adjust the control parameter:

denying, by the device, the request from the first xApp; and maintaining, by the device, the control parameter with a current configuration applicable to the control parameter as applied by the second xApp.

3. The method of claim 2, wherein the indicating that the second xApp has denied the permission comprises the indicating that the second xApp has denied the permission for the first xApp to adjust the control parameter for a specified period of time.

4. The method of claim 1, further comprising:

assigning, by the device, the control parameter to the second xApp as the primary xApp controlling adjustment of the control parameter, wherein the assigning comprises instructing the second xApp that any adjustment of the control parameter by the first xApp is to be authorized by the second xApp prior to the adjustment of the control parameter by the first xApp.

5. The method of claim 1, further comprising:

determining, by the device, whether the first xApp has a first capability to access the control parameter; and in response to the determining whether the first xApp has the first capability to access the control parameter indicating that the first xApp has the first capability to access the control parameter, excluding, by the device, an access to the control parameter by a third xApp having a second capability to access the control parameter.

6. The method of claim 5, wherein the excluding of the access to the control parameter by the third xApp is for a specified period of time, and further comprising:

upon expiry of the specified period of time, enabling, by the device, the access to the control parameter by the third xApp.

7. The method of claim 1, further comprising:

determining, by the device, that the second xApp is subsequently configuring the control parameter according to an updated configuration that is different than a current configuration applied to the control parameter; and determining, by the device, whether a modification of the control parameter by the first xApp conflicts with the updated configuration applied by the second xApp;

in response to the determining whether the modification of the control parameter by the first xApp conflicts with the updated configuration indicating that the modification of the control parameter by the first xApp conflicts with the updated configuration, terminating, by the device, the modification of the control parameter by the first xApp; and applying the updated configuration of the second xApp to the control parameter.

8. The method of claim 1, wherein the device is located in one of a real-time RAN intelligent controller (RIC) or a near-real-time RIC.

9. The method of claim 1, further comprising:

monitoring, by the device, operational history of the RAN;

determining, by the device, assignment of the control parameter to the second xApp is detrimental to operation of the RAN; and removing, by the device, assignment of the control parameter to the second xApp.

10. A system, comprising:

at least one processor, and a memory coupled to the at least one processor and having instructions stored thereon, wherein, in response to execution by the at least one processor, the instructions facilitate performance of operations, comprising:

receiving a configuration request from a first extended application (xApp), wherein the configuration request is to configure a control parameter utilized in a radio access network (RAN);

determining that the control parameter is assigned to a second xApp as a primary xApp controlling adjustment of the control parameter;

identifying, in the configuration request, a first configuration to be applied by the first xApp to the control parameter;

determining whether the first configuration conflicts with a second configuration applied to the control parameter by the second xApp based on whether implementation of the first configuration would negatively impact operation of the RAN based on the second configuration applied by the second xApp; and in response to determining that the first configuration conflicts with the second configuration, denying the configuration request received from the first xApp.

11. The system of claim 10, wherein the operations further comprise:

assigning the control parameter to the second xApp as the primary xApp for the control parameter, wherein access to the control parameter is determined based on one or more configurations implemented by second xApp.

12. The system of claim 10, wherein the operations further comprise:

reviewing operational history of the RAN;

determining current operation of the RAN can be improved by reassigning the control parameter to a third xApp;

terminating assignment of the control parameter to the second xApp; and assigning the control parameter to the third xApp.

13. The system of claim 10, wherein the operations further comprise:

in response to determining the first configuration does not conflict with the second configuration, applying the first configuration to the control parameter.

14. The system of claim 10, wherein the first xApp is denied access to the control parameter for a defined period of time.

15. The system of claim 14, wherein the operations further comprise:

upon expiry of the defined period of time, determining whether the first configuration conflicts with the second configuration applied to the control parameter by the second xApp; and in response to determining no conflict exists between the first configuration and the second configuration after the expiry of the defined period of time, applying the first configuration received from the first xApp.

16. The system of claim 10, wherein the operations further comprise:

while determining whether the first configuration conflicts with the second configuration, preventing access to the control parameter by a third xApp.

17. A computer program product stored on a non-transitory computer-readable medium and comprising machine-executable instructions, wherein, in response to being executed, the machine-executable instructions cause a machine to perform operations, comprising:

assigning a control parameter to a first extended application (xApp) as a primary xApp controlling adjustment of the control parameter, wherein the control parameter is configured to control operation of a feature of network equipment that is part of a radio access network (RAN);

receiving, from a second xApp, a configuration request, wherein the configuration request comprises a first configuration to be applied to the control parameter;

determining whether the first configuration conflicts with a second configuration of the control parameter applied by the second xApp based on an assessment of whether the first configuration would negatively impact the second configuration, wherein the control parameter is currently configured with the second configuration; and in response to a result of the determining being that the first configuration conflicts with the second configuration, denying the configuration request received from the second xApp.

18. The computer program product according to claim 17, the operations further comprise:

in response to a determination that the first configuration does not conflict with the second configuration, applying the configuration request received from the second xApp to the control parameter.

19. The computer program product according to claim 17, wherein the configuration request received from the second xApp is denied for a predefined duration of time, wherein the operations further comprise:

in response to a determination that the predefined duration of time has expired, re-determining whether the first configuration conflicts with the second configuration; and in response to a result of the re-determining being that the first configuration does not conflict with the second configuration, applying the configuration request received from the second xApp to the control parameter.

20. The computer program product according to claim 17, the operations further comprise, while determining whether the first configuration conflicts with the second configuration, preventing access to the control parameter by a third xApp.

* * * * *